US011823393B2

(12) United States Patent
Bao et al.

(10) Patent No.: US 11,823,393 B2
(45) Date of Patent: Nov. 21, 2023

(54) SCENE DETECTION METHOD, CHIP, ELECTRONIC DEVICE, AND STORAGE MEDIUM

(71) Applicant: AMLOGIC (SHANGHAI) CO., LTD, Shanghai (CN)

(72) Inventors: Zheng Bao, Shanghai (CN); Tao Ji, Shanghai (CN); Zhihong He, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD, Shanghai (CN)

( * ) Notice: Subject to any disclaimer, the term of this patent is extended or adjusted under 35 U.S.C. 154(b) by 199 days.

(21) Appl. No.: 17/304,959

(22) Filed: Jun. 29, 2021

(65) Prior Publication Data
US 2021/0407104 A1 Dec. 30, 2021

(30) Foreign Application Priority Data

Jun. 30, 2020 (CN) .......................... 202010613548.9

(51) Int. Cl.
G06T 7/223 (2017.01)
G06V 10/98 (2022.01)
(52) U.S. Cl.
CPC ............ G06T 7/223 (2017.01); G06V 10/993 (2022.01)

(58) Field of Classification Search
None
See application file for complete search history.

(56) References Cited

U.S. PATENT DOCUMENTS

2013/0176487 A1* 7/2013 Nakashima ............ H04N 7/014
348/452
2016/0014433 A1* 1/2016 Raina ..................... H04N 19/86
375/240.27
2021/0407104 A1* 12/2021 Bao ....................... G06V 10/993

FOREIGN PATENT DOCUMENTS

JP 6701905 B2 5/2020

OTHER PUBLICATIONS

WIPO Search for EP3933767, Written Search Opinion, First Made Available Dec. 21, 2021, Available online: https://patentscope.wipo.int/search/en/detail.jsf?docId=EP346700467&_fid=CN347700531 (Year: 2021).*

* cited by examiner

Primary Examiner — Tahmina N Ansari
(74) Attorney, Agent, or Firm — Lorenz & Kopf, LLP

(57) ABSTRACT

The present disclosure relates to a scene detection method, a chip, an electronic device, and a storage medium, the present disclosure detects periodic scenes, which helps to improve the accuracy of motion estimation.

17 Claims, 10 Drawing Sheets (a)

(b)

(c)

SCENE DETECTION METHOD, CHIP, ELECTRONIC DEVICE, AND STORAGE MEDIUM

CROSS-REFERENCE TO RELATED APPLICATION

This application claims priority to Chinese Patent Application No. 202010613548.9, filed Jun. 30, 2020, which is incorporated in its entirety by reference.

TECHNICAL HELD

The present disclosure relates to the technical field of image processing technologies, and in particular, to a scene detection method, a chip, an electronic device, and a storage medium.

BACKGROUND

Video frame rate is a measure of the number of frames played by a display device in one second, and in general, human eyes feel more realistic and smooth in a video at a frame rate of 60 frames per second. In practical application, when video resources of a low frame rate are played on a display device, human eyes can feel jitter and blur. To solve the video jitter and blur effect caused by the low frame rate, the subjective visual effect of the video image can be improved by the video frame rate increasing technique. If we simply use a simple frame repetition or a method of averaging adjacent frames to increase the frame rate, the problem of video jitter and blur cannot be solved.

The main techniques for video frame rate conversion are motion estimation (ME) and motion compensation (MC), there are various algorithms for motion estimation. Frame Rate Up-Conversion (FRUC) technique generally divides each image frame in the video into several blocks of the same size, and the change of adjacent frames in the background area is relatively subtle, and the technique tries to search the corresponding position of each block in the adjacent frames, and the relative offset of the block position in space between the adjacent frames is the motion vector of the current block.

In real life, most repetitive scenes are regular in spatial location and visualization, periodic scenes have relatively obvious geometric structure characteristics, and dynamic textures are repeated in space, time-varying motion sequences.

SUMMARY

The present disclosure provides a scene detection method, a chip, an electronic device, and a storage medium, to improve the image quality of the motion scene.

In some embodiments, a scene detection method includes: calculating a match error between a current central block and a surrounding block within a search range centered on the current central block; obtaining a first match error reference maximum value based on the central block along a row direction as a horizontal prediction depth; obtaining a second match error reference maximum value based on the central block along a column direction as a vertical prediction depth; setting a first horizontal threshold and a second horizontal threshold based on the horizontal prediction depth, and the first horizontal threshold is greater than the second horizontal threshold; along the row direction of the search range, based on a relative magnitude of the match error of the block with the first horizontal threshold and with the second horizontal threshold, judging the number of periodic changes of match error as a first numerical value; setting a first vertical threshold and a second vertical threshold based on the vertical prediction depth, and the first vertical threshold is greater than the second vertical threshold; along the column direction of the search range, based on a relative magnitude of the match error of the block with the first vertical threshold and with the second vertical threshold, judging the number of periodic changes of match error as a second numerical value; and determining whether the current central block is located in a periodic scene or not based on the first numerical value find the second numerical value.

The technical solutions of embodiments of the present disclosure have the following advantages. In the scene detection method provided by the embodiment of the present disclosure, the more similar the surrounding blocks are to the current central block, the smaller the match error, and conversely, the less similar the surrounding blocks are to the current central block, the larger the match error, therefore, if the central block is located in a periodic scene, the match error between the surrounding blocks and the current central block has a periodically changing process within the search range centered on the current block. The embodiments of the present disclosure are able to analyze whether the similarity of the corresponding block along the row direction to the current central block changes periodically and the number of times it changes periodically as a first value by setting a first horizontal threshold and a second horizontal threshold according to the horizontal prediction depth and judging the number of times the match error along the search range row direction based on the relative magnitude of the match error of the block to the first horizontal threshold and the second horizontal threshold; and by setting a first vertical threshold and a second vertical threshold based on the vertical prediction depth and determining the number of times the match error periodically changes as a second value based on the relative magnitude of the match error of the block along the search range column direction to the first vertical threshold and the second vertical threshold, thereby enabling analysis of whether the similarity of the corresponding block along the column direction to the current central block changes periodically and the number of times it changes periodically; Accordingly, the embodiments of the present disclosure can determine whether the current central block is located in the periodic scene according to the first value and second value, so that subsequent motion estimation can be performed according to the periodic pattern of the scene, which is conducive to reducing the probability of deviations in motion estimation resulting in problems such as broken lines, improving the accuracy of motion estimation, which in turn is conducive to improving the image quality of the motion scene.

BRIEF DESCRIPTION Of THE DRAWINGS

The accompanying drawings, which comprise a part of this specification, illustrate several embodiments and, together with the description, serve to explain the principles and features of the disclosed embodiments. In the drawings.

DETAILED DESCRIPTION

Reference wilt now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses, systems and methods consistent with aspects related to the disclosure as recited in the appended claims.

According to the background technology, in real life, most repetitive scenes are regular in spatial location and visualization. However, there is a large uncertainty in the motion vectors estimated for periodic scenes and the correct motion vectors cannot be detected, the process of detecting motion vectors for some repetitive mesh or line scenes in the image becomes complicated and error-prone, which tends to reduce the accuracy of motion estimation.

Figure 1:
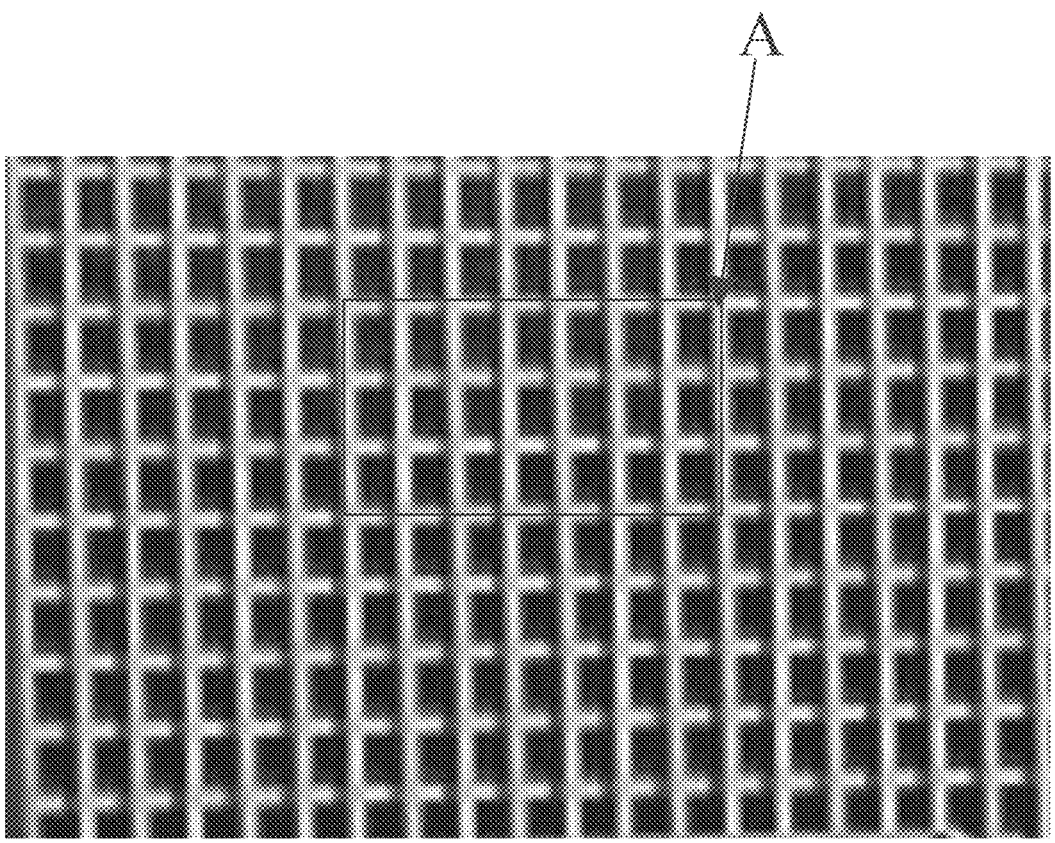
FIG. 1 is a schematic diagram of a periodic scene.

Specifically, for some special complex scenes, it is difficult to accurately detect the correct motion vector using existing motion estimation techniques. FIG. 1 shows a schematic diagram of a periodic scene. As shown in FIG. 1 at the location indicated by the dashed arrow, the scene is all periodic lines, and any deviation in the motion estimation will result in broken lines and affect the image quality of the whole scene.

To solve the technical problem, in the scene detection method provided by the embodiment of the present disclosure, the more similar the surrounding blocks are to the current central block, the smaller the match error, and conversely, the less similar the surrounding blocks are to the current central block, the larger the match error, therefore, if the central block is located in a periodic scene, the match error between the surrounding blocks and the current central block has a periodically changing process within the search range centered on the current block. The embodiments of the present disclosure are able to analyze whether the similarity of the corresponding block along the row direction to the current central block changes periodically and the number of times it changes periodically as a first value by setting a first horizontal threshold and a second horizontal threshold according to the horizontal prediction depth and judging the number of times the match error along the search range row direction based on the relative magnitude of the match error of the block to the first horizontal threshold and the second horizontal threshold; and by setting a first vertical threshold and a second vertical threshold based on the vertical prediction depth and determining the number of times the match error periodically changes as a second value based on the relative magnitude of the match error of the block along the search range column direction to the first vertical threshold and the second vertical threshold, thereby enabling analysis of whether the similarity of the corresponding block along the column direction to the current central block changes periodically and the number of times it changes periodically; Accordingly, the embodiments of the present disclosure can determine whether the current central block is located in the periodic scene according to the first value and second value, so that subsequent motion estimation can be performed according to the periodic pattern of the scene, which is conducive to reducing the probability of deviations in motion estimation resulting in problems such as broken lines, improving the accuracy of motion estimation, which in turn is conducive to improving the image quality of the motion scene.

Figure 2:
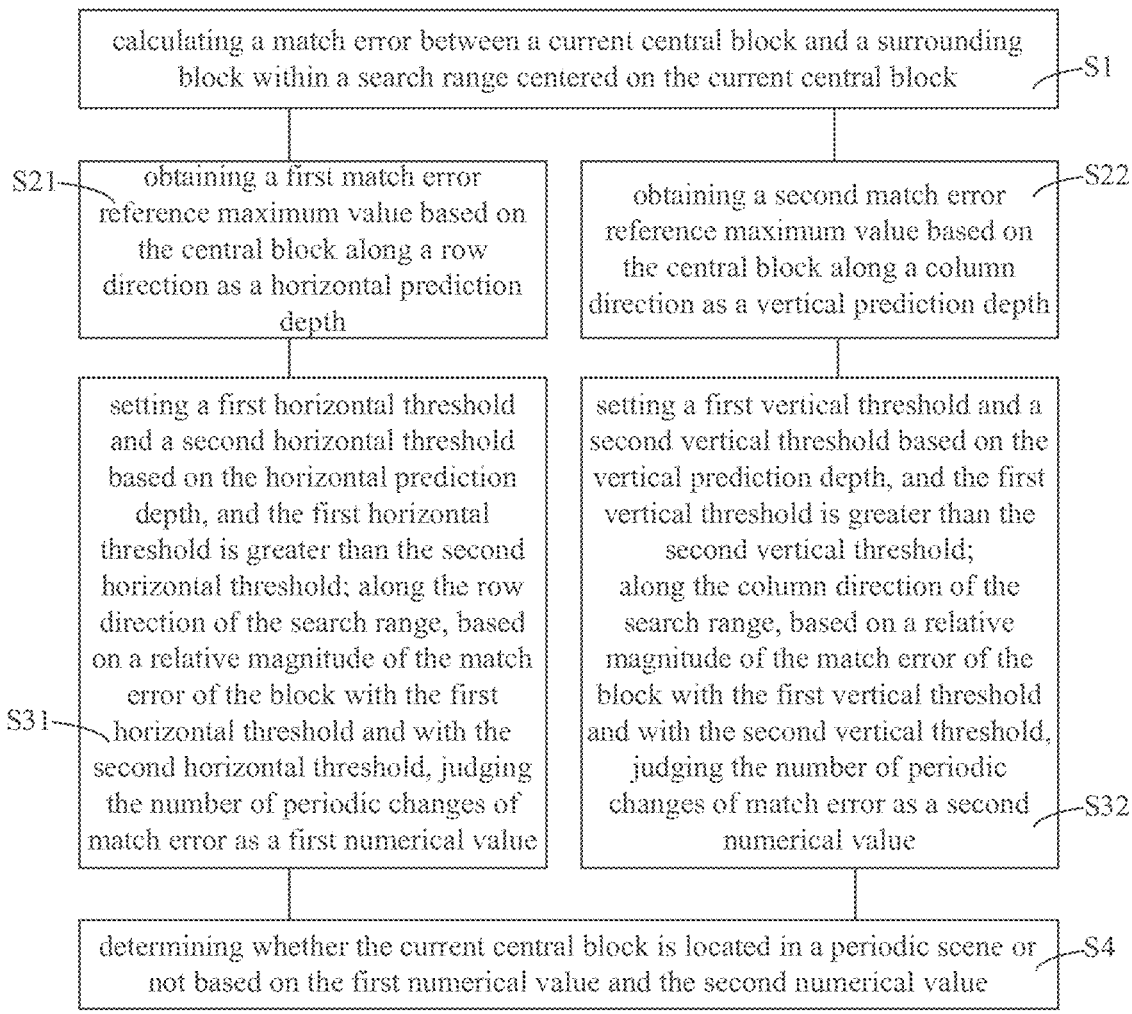
FIG. 2 is a flowchart of an embodiment of the scene detection method provided by the present disclosure.

FIG. 2 is a flowchart of an embodiment of the scene detection method provided by the present disclosure. As an example, the scene detection method provided in this embodiment comprises the following basic steps:

Step S1: calculating a match error between a current central block and a surrounding block within a search range centered on the current central block:

Step S21: obtaining a first match error reference maximum value based on the central block along a row direction as a horizontal prediction depth.

Step S22: obtaining a second match error reference maximum value based on the central block along a column direction as a vertical prediction depth.

Step S31: setting a first horizontal threshold and a second horizontal threshold based on the horizontal prediction depth, and the first horizontal threshold is greater than the second horizontal threshold, along the row direction of the search range, based on a relative magnitude of the match error of the block with the first horizontal threshold and with the second horizontal threshold, judging the number of periodic changes of match error as a first numerical value;

Step S32: setting a first vertical threshold and a second vertical threshold based on the vertical prediction depth, and the first vertical threshold is greater than the second vertical threshold; along the column direction of the search range, based on a relative magnitude of the match error of the block with the first vertical threshold and with the second vertical threshold, judging the number of periodic changes of match error as a second numerical value;

Step S4: determining whether the current central block is located in a periodic scene or not based on the first numerical value and the second numerical value.

In order to make the above purposes, features and advantages of the embodiments of the present disclosure more obvious and understandable, the following detailed description of specific embodiments of the present disclosure is made in conjunction with the accompanying drawings.

Refer to FIG. 2, performing step S1: calculating a match error between a current central block and a surrounding block within a search range centered on due current central block.

The match error is used for representing the matching degree between blocks and the similarity between blocks. The more similar the two adjacent blocks are, the smaller the match error is. Specifically, in this embodiment, the matching degree between the surrounding block and the current central block is calculated by calculating the match error between the surrounding block and the current central block.

Calculating the match error between the surrounding block and the current central block, and thus subsequently obtaining a first match error reference maximum value centered on the central block along a row direction, and obtaining a second match error reference maximum value centered on the central block along a column direction, based on the match error data calculated.

As an example, calculating the match error between the surrounding block and the current central block based on formula (1).

$$\text{error}_{i,j} = \sum_{r=1}^{N} \sum_{c=1}^{N} (\text{abs}(B_{i,j}(r, c) - B_{center}(r, c))), (i, j) \in [-s, s] \quad (1)$$

Figure 3:
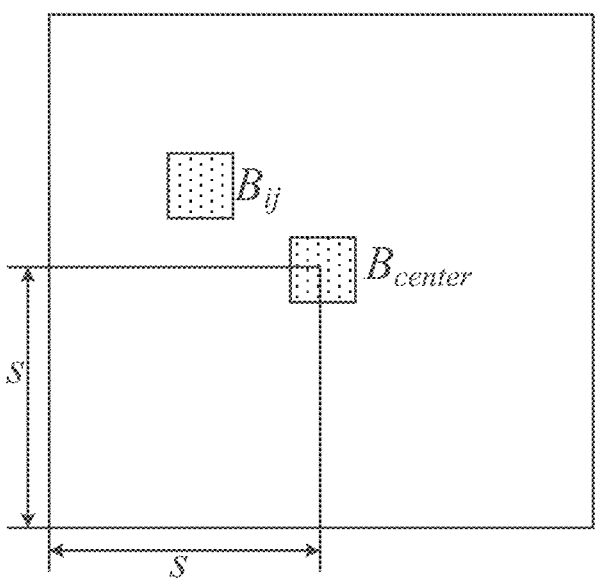
FIG. 3 is a schematic diagram of the process of calculating the match error between the surrounding blocks and the current central block in FIG. 2.

Combined with reference to FIG. 3, a schematic diagram of the process of calculating the match error between the surrounding blocks and the current central block in FIG. 2 is illustrated, and referring to formula (1). Where Bcenter represents the current central block. Bi,j represents the block in the region of (2*s+1)*(2*s+1) around the center of the Bcenter, and the size of the block is N*N; I and j represent the distance between the surrounding blocks and the current central block in the row and column directions, respectively, $\text{error}_{i,j}$ represents the match error between the surrounding blocks and the current central block.

In this embodiment, utilizing ABS (Absolute Balance Search) matching algorithm to calculate the match error. Specifically, the ABS matching algorithm can be SAD (Sum of Absolute Differences) or SSD (Sum of Squared Differences), etc. In other embodiments, it is also possible to calculate the match error between the surrounding blocks and the current central block using other suitable algorithms.

It should be noted that in the specific implementation, the size of the search range needs to be set reasonably according to the actual situation, so that the search range can correctly reflect the periodicity of the image.

The more similar the surrounding blocks are to the current central block, the smaller the match error, and conversely, the less similar the surrounding blocks are to the current central block, the larger the match error, therefore, if the central block is located in a periodic scene, the match error between the surrounding blocks and the current central block has a periodically changing process within the search range centered on the current block.

Figure 4:
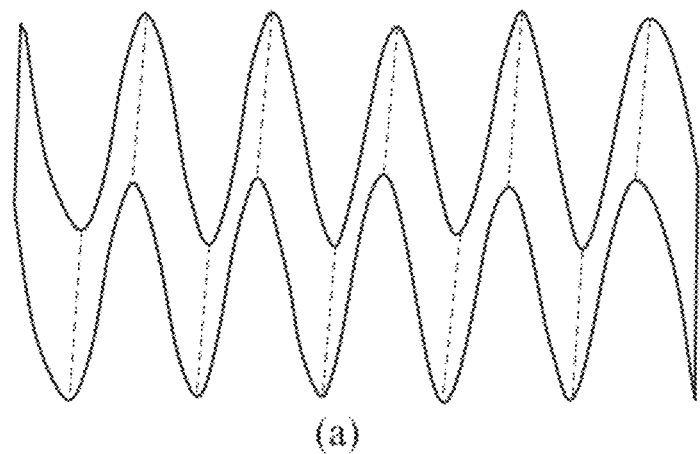
FIG. 4 is an image of the block match error functions corresponding to some periodic scenes.
Figure 4:
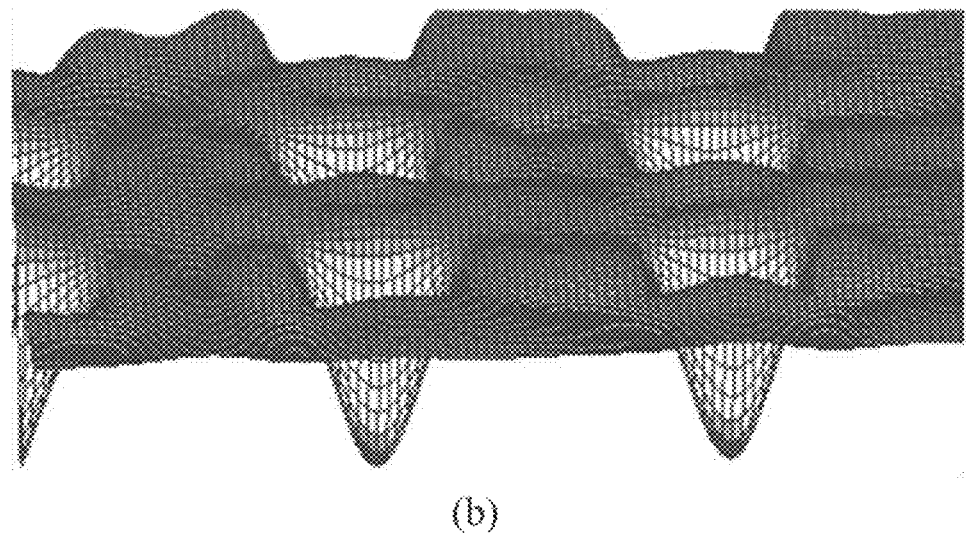
Figure 4:
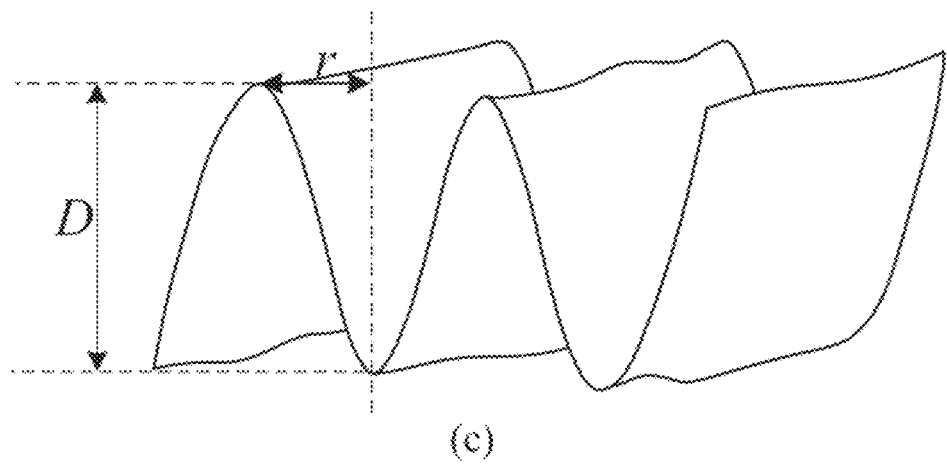

In combination with reference to FIG. 4, wherein FIG. 4(a), FIG. 4(b), and FIG. 4(c) illustrate images of block match error functions corresponding to some periodic scenes. From the image illustrated in FIG. 4, it can be seen that the block match error surface corresponding to periodic scenes has multiple "V"-like shapes in at least one direction, i.e., it has a periodic "V"-like shape in at least one direction, reflecting the periodic scene corresponding to the block match error with periodic changes in the process.

With continued reference to FIG. 2, performing step S21: obtaining a first match error reference maximum value based on the central block along a row direction as a horizontal prediction depth.

The horizontal prediction depth is used as a reference value for the subsequent setting of the first horizontal threshold and the second horizontal threshold.

As an example, combined with the reference FIG. 4(c), in this embodiment, the horizontal prediction depth is the depth D of the "V" shape in the image, which is the difference between the first match error reference maximum value and the match error at the current central block position. Since the match error at the current central block position is zero, which is the lowest match error point, the first match error reference maximum value is the depth D of "V" shape.

Figure 5:
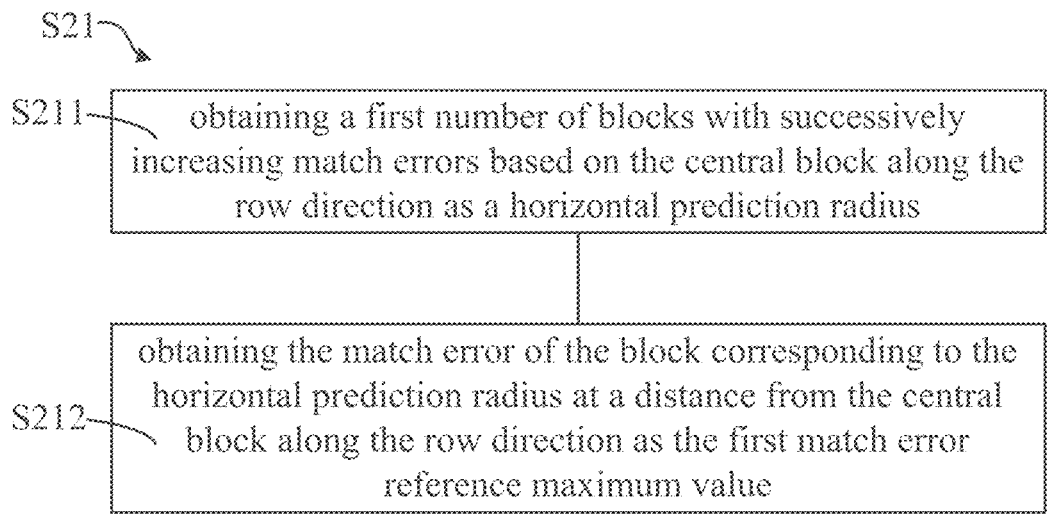
FIG. 5 is a flowchart of an embodiment of step S21 in FIG. 2.

Combined with the reference FIG. 5, a flowchart of an embodiment of step S21 in FIG. 2 is illustrated. As an example, the steps of obtaining the first match error reference maximum value comprise:

Executing step S211: obtaining a first number of blocks with successively increasing match errors based on the central block along the row direction as a horizontal prediction radius.

The match error of the current central block is zero, the current central block is the minimum match error point, and the similarity between the surrounding blocks of the current central block and the current central block gradually decreases along the first horizontal direction of the row direction or along the second horizontal direction of the row direction from the current central block, therefore, from the first horizontal direction of the current central block along the row direction or the second horizontal direction along the row direction, the match error between the surrounding blocks and the current central block is also increasing. If the search range centered on the current central block is a periodic scene, the match error between the surrounding blocks and the current central block increases continuously in the first horizontal direction or in the second horizontal direction from the current central block until the match error reaches a maximum at a certain block, and then gradually decreases in the process of approaching the repeating block in the next period corresponding to the current central block until the match error reaches a minimum again at the position of the repeating block searched in the next period corresponding to the current central block.

Therefore, in this embodiment, the horizontal prediction radius refers to: from the current central block toward the first horizontal direction along the row direction or toward the second horizontal direction along the row direction, the match error increases continuously to a certain block when it no longer increases continuously, and the distance between that block and the current central block along the row direction is the horizontal prediction radius. With reference to FIG. 4(c), in this embodiment, the horizontal prediction radius refers to the horizontal distance r between the lowest and highest points of the "V" shape.

Accordingly, in this embodiment, by obtaining a first number of blocks with successively increasing match errors as the horizontal prediction radius, it is subsequently possible to obtain a first match error reference maximum value along the row direction based on the horizontal prediction radius.

As an example, the first horizontal direction along the row direction is the direction to the left from the current central block, and the second horizontal direction along the row direction is the direction to the right from the current central block.

Specifically, in this embodiment, obtaining the horizontal prediction radius comprises: based on formula (2.1), obtaining the number of blocks with successively increasing match errors from the current central block along a first horizontal direction of the row as a first horizontal prediction number of blocks $r_{left}$, based on formula (2.2), obtaining the number of blocks with successively increasing match errors from the current central block along a second horizontal direction of the row as a second horizontal prediction number of blocks $r_{right}$; according to formula (2.3), taking a smaller of the first horizontal prediction number of blocks and the second horizontal prediction number of blocks as the first number of blocks $r_1$, wherein the first number of blocks $r_1$ is used as the horizontal prediction radius.

$$r_{left}=r_{left}+1, \text{until}(\text{error}_{i,j} \geq \text{error}_{i,j+1}), i=0, -s \leq j \leq -1 \quad (2.1)$$

$$r_{right}=r_{right}+1, \text{until}(\text{error}_{i,j} \leq \text{error}_{i,j+1}), i=0, 1 \leq j \leq s \quad (2.2)$$

$$r_1=\min(r_{left}, r_{right}) \quad (2.3)$$

In specific implementation, the first horizontal prediction number of blocks $r_{left}$ and the second horizontal prediction number of blocks $r_{right}$ are not necessarily the same, by taking a smaller $\min(r_{left}, r_{right})$ of the first horizontal prediction number of blocks $r_{left}$ and the second horizontal prediction number of blocks $r_{right}$ as the first number of blocks $r_1$, it is conducive to reducing the probability of misjudgment, improving the accuracy of the first match error reference extreme value, and correspondingly improving the accuracy of determining whether the current central block is located in the periodic scene. As an example, s=8. In the other embodiments, s can also be other reference values.

Performing step S212: obtaining the match error of the block corresponding to the horizontal prediction radius at a distance from the central block along the row direction as the first match error reference maximum value.

The block corresponding to the central block with the distance along the row direction as the horizontal prediction radius is the block with successively increasing match error based on the central block in the first horizontal direction along the row or in the second horizontal direction along the row, so that the match error of the block corresponding to the central block with the distance along the row direction as the horizontal prediction radius is the maximum point along the row direction, which is the highest point of the "V" shape in FIG. 4(c), and can be used as the first match error reference extreme value, i.e. the horizontal prediction depth. Accordingly, the first horizontal threshold and the second horizontal threshold, which are subsequently set based on the horizontal prediction depth, can be used as a benchmark for determining whether the match error has a "V" shape along the row direction.

Specifically, in this embodiment, obtaining a first number of blocks with successively increasing match errors based on the central block along the row direction as a horizontal prediction radius comprises: obtaining a first match error $\text{error}_{0,-r_1}$ corresponding to the block located on one side of the central block along the row direction and at a distance from the central block with the horizontal prediction radius $r_1$, and obtaining a second match error $\text{error}_{0,r_1}$ corresponding to the block located on the other side of the central block along the row direction and at a distance from the central block with the horizontal prediction radius $r_1$; Combined with the reference formula (2.4), taking a smaller min ($\text{error}_{0,-r_1}, \text{error}_{0,r_1}$) of the first match $\text{error}_{0,-r_1}$ and the second match $\text{error}_{0,r_1}$ as the first match error reference maximum value $D_1$.

$$D_1=\min(\text{error}_{0,-r_1}, \text{error}_{0,r_1}) \quad (2.4)$$

With continued reference to FIG. 2, obtaining a second match error reference maximum value based on the central block along a column direction as a vertical prediction depth.

The vertical prediction depth is used as a reference value for the subsequent setting of the first vertical threshold and the second vertical threshold.

Figure 6:
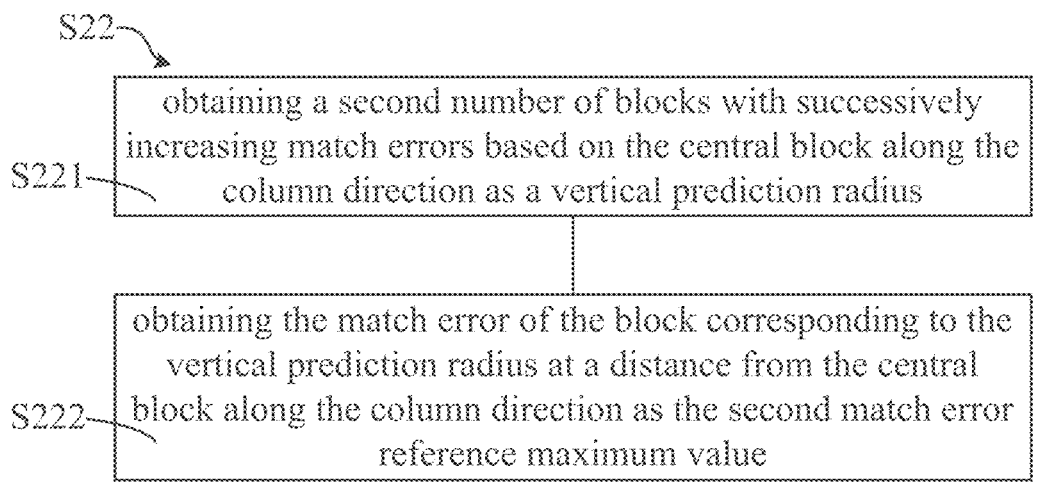
FIG. 6 is a flowchart of an embodiment of step S22 in FIG. 2.

Combined with reference to FIG. 6, which is a flowchart of an embodiment of step S22 in FIG. 2. As an example, obtaining the second match error reference maximum value comprises:

Executing step S221: obtaining a second number of blocks with successively increasing match error based on the central block along the column direction as a vertical prediction radius.

The match error of the current central block is zero, the current central block is the minimum match error point, and the similarity between the surrounding blocks of the current central block and the current central block gradually decreases along the first vertical direction of the column direction or along the second vertical direction of the column direction from the current central block, therefore, from the first vertical direction of the current central block along live column direction or the second vertical direction along the column direction, the match error between the surrounding blocks and the current central block is also increasing. If the search range centered on live current central block is a periodic scene, the match error between the surrounding blocks and the current central block increases continuously in the first vertical direction or in the second vertical direction from the current central block until the match error reaches a maximum at a certain block, and then gradually decreases in the process of approaching the repeating block in the next period corresponding to the current central block until the match error reaches a minimum again at the position of the repeating block searched in the next period corresponding to the current central block.

Therefore, in this embodiment, the vertical prediction radius refers to: from the current central block toward the first vertical direction along the column direction or toward the second vertical direction along the column direction, the match error increases continuously to a certain block when it no longer increases continuously, and the distance between that block and the current central block along the column direction is the vertical prediction radius.

Accordingly, in this embodiment, by obtaining the second number of blocks with successively increasing match error along the column direction as the vertical prediction radius, it is subsequently possible to obtain a second match error reference maximum value along the column direction based on the vertical prediction radius.

As an example, the first vertical direction along the column direction is the upward direction from the current block, and the second vertical direction along the column direction is the downward direction from the current block.

Specifically, in this embodiment, obtaining the vertical prediction radius comprises: based on formula (3.1), obtaining the number of blocks with successively increasing match errors from the current central block along a first vertical direction of the column as a first vertical prediction number of blocks $r_{up}$; based on formula (3.2), obtaining the number of blocks with successively increasing match errors from the current central block along a second vertical direction of the column as a second vertical prediction number of blocks $r_{down}$; based on formula (3.3), taking a smaller $\min(r_{up},r_{down})$ of the first vertical prediction number of blocks $r_{up}$ and the second vertical prediction number of blocks $r_{down}$ as the second number of blocks $r_2$.

$$r_{up}=r_{up}+1, \text{until}(error_{i,j} \geq error_{i+1,j}), j=0, -s \leq i \leq -1 \quad (3.1)$$

$$r_{down}=r_{down}+1, \text{until}(error_{i,j} \leq error_{i+1,j}), j=0, 1 \leq i \leq s \quad (3.2)$$

$$r_2=\min(r_{up},r_{down}) \quad (3.3)$$

In specific implementation, the first vertical prediction number of blocks $r_{up}$ and the second vertical prediction number of blocks $r_{doen}$ are not necessarily the same, by taking a smaller $\min(r_{up},r_{down})$ of the first vertical prediction number of blocks $r_{up}$ and the second vertical prediction number of blocks $r_{down}$ as the first number of blocks $r_2$, it is conducive to reducing the probability of misjudgment, improving the accuracy of the second match error reference extreme value, and correspondingly improving the accuracy of determining whether the current central block is located in the periodic scene. As an example, s=8. In the other embodiments, s can also be other reference values.

Executing step S222: obtaining the match error of the block corresponding to the vertical prediction radius at a distance from the central block along the column direction as the second match error reference maximum value.

The block corresponding to the central block with the distance along the column direction as the vertical prediction radius is the block with successively increasing match error based on the central block in the first vertical direction along the column or in the second vertical direction along the column, so that the match error of the block corresponding to the central block with the distance along the column direction as the vertical prediction radius is the maximum point along the column direction, which is the highest point of the "V" shape, and can be used as the second match error reference extreme value, i.e. the vertical prediction depth. Accordingly, the first vertical threshold and the second vertical threshold, which are subsequently set according to the vertical prediction depth, can be used as a benchmark for determining whether the match error has a "V" shape along the column direction.

Specifically, in this embodiment, obtaining the match error of the block corresponding to the vertical prediction radius at a distance from the central block along the column direction as the second match error reference maximum value comprise: obtaining a third match error $error_{-r_2,0}$ corresponding to the block located on one side of the central block along the column direction and at a distance from the central block with the vertical prediction radius $r_2$, and obtaining a fourth match error $error_{r_2,0}$ corresponding to the block located on the other side of the central block along the column direction and at a distance from the central block with the vertical prediction radius $r_2$; taking a smaller $\min(error_{-r_2,0}, error_{r_2,0})$ of the third match error $error_{-r_2,0}$ and the fourth match error $error_{r_2,0}$ as the second match error reference maximum value $D_2$ based on formula (3.4).

$$D_2=\min(error_{-r_2,0}, error_{r_2,0}) \quad (3.4)$$

With continued reference to FIG. 2, perform step S31: setting a first horizontal threshold and a second horizontal threshold based on the horizontal prediction depth, and the first horizontal threshold is greater than the second horizontal threshold; along the row direction of the search range, based on a relative magnitude of the match error of the block with the first horizontal threshold and with the second horizontal threshold, judging the number of periodic changes of match error as a first numerical value.

A periodic scene is one in which the block match error exhibits a geometric periodicity within a specified region. The embodiments of the present disclosure are able to analyze whether the similarity of the corresponding block along the row direction to the current central block changes periodically and the number of times it changes periodically as a first value by setting a first horizontal threshold and a second horizontal threshold based on the horizontal prediction depth and judging the number of times the match error along the search range row direction based on a relative magnitude of the match error of the block to the first horizontal threshold and the second horizontal threshold. Accordingly, the embodiments of the present disclosure can determine whether the current central block is located in the periodic scene according to the first value, so that subsequent motion estimation can be performed based on the periodic pattern of the scene, which is conducive to reducing the probability of deviations in motion estimation resulting in problems such as broken lines, improving the accuracy of motion estimation, which in turn is conducive to improving the image quality of the motion scene.

The first horizontal threshold is used as a high reference threshold $th_{high}$, and subsequently the relative magnitude of the match error of the block with the first horizontal threshold in turn along the row direction is compared to determine whether the match error of the block has an incremental process, that is, to determine whether the match error of the block has an incremental trend.

Therefore, the first horizontal threshold should not be too small or too large compared to the horizontal prediction depth. If the first horizontal threshold is too small compared to the horizontal prediction depth, the accuracy of the judgment is easily reduced when comparing the relative magnitude of the match error of the block to the first horizontal threshold in sequence along the row direction to determine whether there is an incremental process of the match error of the block; if the first horizontal threshold is too large compared to the horizontal prediction depth, in a specific implementation, it is easy to not find blocks with a match error greater than the first horizontal threshold when determining whether there is an incremental process of match error for the block.

In this embodiment, the first horizontal threshold $th_{high}=k_{high}*D_1$, where $k_{high} \in (0,1)$, and $k_{high}$ is a larger value of (0,1), that is, $k_{high}$ is a value close to 1. As an example, $k_{high} \in (0.5,1)$.

As an example, as shown in formula (4.0), the first horizontal threshold is set to ¾ of the horizontal predication depth.

$$th_{high}=3 \times D_1/4 \quad (4.0)$$

The second horizontal threshold is less than the first horizontal threshold, and the second horizontal threshold is used as a low reference threshold, the subsequent process of comparing the relative magnitude of the match error of the block with the second horizontal threshold in turn along the row direction to determine whether the match error of the block has a decreasing process, that is, to determine whether the match error of the block has an decreasing trend.

Therefore, the second horizontal threshold should not be too small or too large compared to the horizontal prediction depth. If the second horizontal threshold is too small compared to the horizontal prediction depth, in the specific implementation, when comparing the relative magnitude of the match error of the block to the second horizontal threshold in sequence along the row direction to determine whether there is a decreasing process of the match error of the block, it is easy not to find the block with a match error less than the second horizontal threshold; If the second horizontal threshold is too large compared to the horizontal prediction depth, it lends to reduce the accuracy of the judgment when determining whether there is a decreasing process of match error in the block.

In this embodiment, the second horizontal threshold $th_{low}=k_{low}*D_1$, where $k_{low} \in (0,1)$, $k_{low} < k_{high}$, and $k_{low}$ is a smaller value of (0,1), that is, $k_{low}$ is a value close to 0. As an example, $k_{low} \in (0,0.5)$.

As an example, as shown in formula (4.1), the second horizontal threshold is set to ¼ of the horizontal predication depth.

$$th_{low}=D_1/4 \quad (4.1)$$

Figure 7:
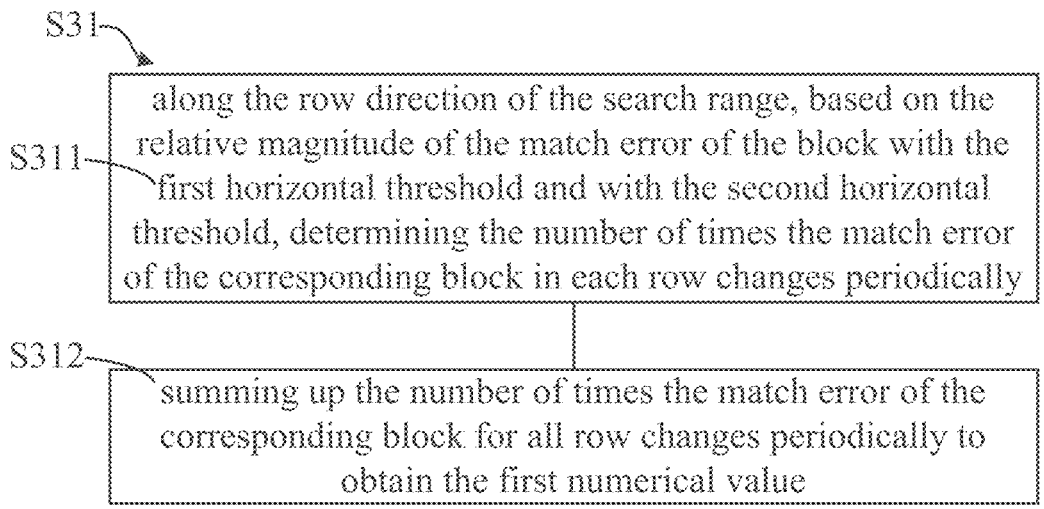
FIG. 7 is a flowchart of an embodiment of step S31 in FIG. 2

In combination with reference to FIG. 7, a flowchart of an embodiment of step S31 in FIG. 7 is illustrated. As an example, the steps of obtaining the first numerical comprise:

Executing step S311: along the row direction of the search range, based on a relative magnitude of the match error of the block with the first horizontal threshold and with the second horizontal threshold, determining the number of times the match error of the corresponding block in each row changes periodically.

As an example, determining the number of times the match error of the corresponding block in each row changes periodically comprises: comparing the relative magnitude of the block match error with the first horizontal threshold in turn along the row to determine whether there is an incremental process of match error of the block; comparing the relative magnitude of the block match error with the second horizontal threshold in turn along the row to determine whether there is a decreasing process of match error of the block; based on the first horizontal threshold and the second horizontal threshold, marking a process of increasing match error and a process of decreasing match error as a period, obtaining the number of the periods as a number of times the match error changes periodically for the corresponding block of the current row.

Comparing the relative magnitude of the block match error with the first horizontal threshold in turn along the row to determine whether there is an incremental process of match error of the block, that is, to determine whether the match error of the block has a tendency to increase continuously; comparing the relative magnitude of the block match error with the second horizontal threshold in turn along the row to determine whether there is a decreasing process of match error of the block, that is, to determine whether the match error of the block has a tendency to decrease continuously; therefore, an increasing process of match error and a decreasing process of match error can reflect whether the match error of the block along the row direction has a process of "getting smaller and larger" or "getting larger and smaller", and a process of "getting smaller and larger" or "getting larger and smaller" is a period, and by obtaining the number of the periods, it is possible to determine whether the match error of the block of the current row has a process of "getting larger and smaller" or "getting smaller and larger" several times, that is, to determine whether the match error of the block of the current row has been changing periodically.

Figure 8:
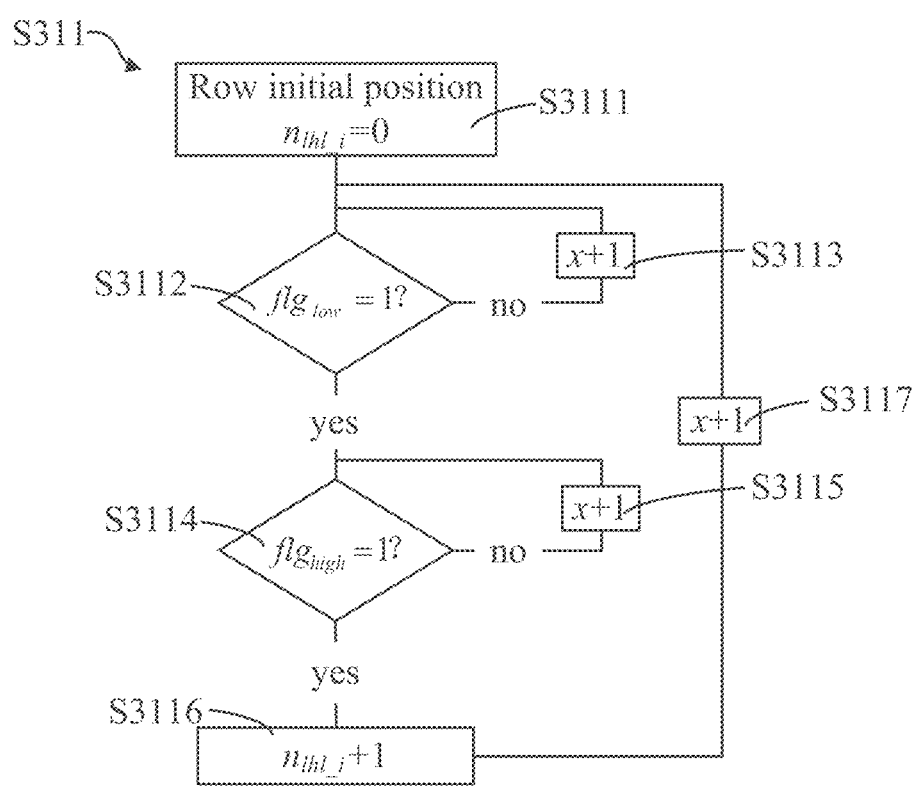
FIG. 8 is a flowchart of an embodiment of step S311 in FIG. 7.

In combination with reference to FIG. 8, which is a flowchart of an embodiment of step S311 in FIG. 7. The following steps of the embodiment of the present disclosure for determining the number of times the match error of the corresponding block in each row changes periodically are described in detail in conjunction with FIG. 8.

Executing step S3111: the first block in the search range of a row is the initial position.

nlhl_i represents the number of times the match error of the corresponding block in the current row changes periodically. At the initial position, nlhl_i is zero.

Executing step S3112: determining whether the match error of the current surrounding block is less than the second horizontal threshold based on formula (4.2)

$$flg_{low} = \begin{cases} 1, & \text{if}(\text{error}(y, x) < th_{low}) \\ 0, & \text{otherwise} \end{cases} \quad (4.2)$$

$flg_{low}=1$ refers to: the error of the current surrounding block is less than the second horizontal threshold.

Determining whether the match error of the current surrounding block is less than the second horizontal threshold, that is, determining whether the current surrounding block is a block close to the minimal value of the match error.

If the match error of the current surrounding block is greater than the second horizontal threshold, executing step S3113: determining whether the match error of the next block of the current row is less than the second horizontal threshold where x+1 denotes the next block of the current row.

If the match error of the current surrounding block is less than the second horizontal threshold, executing step S3114: determining whether the match error of the current surrounding block is greater than the first horizontal threshold.

$$flg_{high} = \begin{cases} 1, & \text{if}(\text{error}(y, x) > th_{high}) \\ 0, & \text{otherwise} \end{cases} \quad (4.3)$$

Determining whether the match error of the current surrounding block is less than the second horizontal threshold, when the match error of the current surrounding block is greater than the second horizontal threshold, the process of determining whether the match error of the next block of the current row is less than the second horizontal threshold until the match error of the current surrounding blocks is less than the second horizontal threshold, that is, the process of determining whether there is a decreasing match error of the blocks.

Determining whether the match error of the current surrounding block is greater than the first horizontal threshold, that is, determining whether the current surrounding block is a block with a match error close to the maximum value.

When the match error of the current surrounding block is less than or equal to the first horizontal threshold, executing step S3115: determining whether the match error of the next block in the current row is greater than the first horizontal threshold.

When the match error of the current surrounding block is greater than the first horizontal threshold, executing step S3115: counting the number of times the match error changes periodically for the corresponding block in the current row.

Wherein the process of determining whether the match error of the current surrounding block is greater than first horizontal threshold, and the process of determining whether the match error of the next block in the current row is greater than first horizontal threshold when the match error of the current surrounding block is less than or equal to first horizontal threshold, until the match error of the current surrounding block is greater than the second level threshold, that is, the process of determining whether there is an incremental match error of the blocks.

When the match error of the current surrounding block is greater than first horizontal threshold, that is, there is a process of increasing match error and a process of decreasing match error for the block of the current row, marking a process of increasing match error and a process of decreasing match error as a period, therefore, counting the number of times the match error changes periodically for the corresponding block in the current row.

It is to be noted that tins embodiment uses as an example to first determine whether the matching error of the current surrounding block is less than second horizontal threshold, and then determine whether the match error of the current surrounding block is greater than the first horizontal threshold. In other embodiments, it is also possible to determine whether the match error of the current surrounding block is greater than first horizontal threshold, and then determine whether the match error of the current surrounding block is less than the second horizontal threshold.

Executing step S3117: after counting the number of times the match error changes periodically for the corresponding block in the current row, returning to step S3112, determining whether the match error for the next block of the current row is less than second horizontal threshold.

By returning to step S3112, determining whether the match error of the next block of the current row is less than the second horizontal threshold, that is, continuing the process of determining whether there is a repeated match error increment and decrement for the remaining blocks of the current row within the search range, each time a match error increment process and a match error decrement process are judged, the number of times the match error changes for the corresponding block of the current row is counted until the last block of the current row in the search range is judged, and the number of times the match error changes periodically for the corresponding block of the current row is obtained.

With continued reference to FIG. 7, performing step S312: summing up the number of times the match error of the corresponding block for all row changes periodically to obtain the first numerical value.

Compared with taking only the number of match error changes periodically of the corresponding block of a row as the second value, obtaining the second value, i.e., judging the number of match error changes periodically of all rows, by accumulating the number of match error changes periodically of the corresponding blocks of all rows, is conducive to improving the accuracy of judging whether the current central block is located in a periodic scene.

Specifically, based on formula (4.4), summing up the number of times $n_{thl\_i}$ the match error of the corresponding block for all row changes periodically to obtain the first numerical value $n_{thl\_r}$, wherein i denotes the current row, sh denotes the number of rows in the search range.

$$n_{thl\_r} = \sum_{i=0}^{s_h} n_{thl\_i} \quad (4.4)$$

With continued reference to FIG. 2, performing step S32: setting a first vertical threshold and a second vertical threshold based on the vertical prediction depth, and the first vertical threshold is greater than the second vertical threshold, along the column direction of the search range, based on a relative magnitude of the match error of the block with the first vertical threshold and with the second vertical threshold, judging the number of periodic changes of match error as a second numerical value.

A periodic scene is one in which the block match error exhibits a geometric periodicity within a specified region. The embodiments of the present disclosure are able to analyze whether the similarity of the corresponding block along the column direction to the current central block changes periodically and the number of times it changes periodically as a second value by setting a first vertical threshold and a second vertical threshold based on the vertical prediction depth and judging the number of times the match error along the search range column direction based on the relative magnitude of the match error of the block to the first vertical threshold and the second vertical threshold. Accordingly, the embodiments of the present disclosure can determine whether the current central block is located in the periodic scene according to the first value and second value, so that subsequent motion estimation can be performed according to the periodic pattern of the scene, which is conducive to reducing the probability of deviations in motion estimation resulting in problems such as broken lines, improving the accuracy of motion estimation, which in turn is conducive to improving the image quality of the motion scene.

In specific implementations, the block match error corresponding to periodic scenarios may changes periodically along only one direction (row direction or column direction), in this embodiment, determining the number of times the match error changes periodically not only along the search range row direction based on the relative magnitude of the match error of the block to the first horizontal threshold and the second horizontal threshold, but also along the search range column direction based on the relative magnitude of the match error of the block to the first vertical threshold and the second vertical threshold, and the row direction is perpendicular to the column direction, compared with judging the number of periodic changes in match error along only one of the directions of the search range, judging the number of periodic changes in match error along both row and column directions helps prevent the situation where the direction of periodic changes in block match error is perpendicular to the direction of search judgment, which leads to missed or misjudged periodic scenes, thus improving the accuracy of subsequent judgment of periodic scenes.

The first vertical threshold is used as a high reference threshold $th_{high}$, and subsequently the relative magnitude of the match error of the block with the first vertical threshold in turn along the column direction is compared to determine whether the match error of the block has an incremental process, that is, to determine whether the match error of the block has an incremental trend.

Therefore, the first vertical threshold should not be too small or too large compared to the vertical prediction depth. If the first vertical threshold is too small compared to the vertical prediction depth, the accuracy of the judgment is easily reduced when comparing the relative magnitude of the match error of the block to the first vertical threshold in sequence along the column direction to determine whether there is an incremental process of the match error of the block; if the first vertical threshold is too large compared to the vertical prediction depth, in a specific implementation, it is easy to not find blocks with a match error greater than the first vertical threshold when determining whether there is an incremental process of match error for the block.

In this embodiment, the first vertical threshold is set to $k_{high}$ times the vertical prediction depth where $k_{high} \in (0,1)$, and $k_{high}$ is a larger value of $(0,1)$, that is, $k_{high}$ is a value close to 1. As an example, $k_{high} \in (0.5,1)$.

As an example, the first vertical threshold is set to ¾ of the vertical predication depth.

The second vertical threshold s less than the first vertical threshold, and the second vertical threshold is used as a low reference threshold, subsequently comparing the relative magnitude of the match error of the block with the second vertical threshold in turn along the column direction to determine whether the match error of the block has a decreasing process, that is, to determine whether the match error of the block has an decreasing trend.

Therefore, the second vertical threshold should not be too small or too large compared to the vertical prediction depth. If the second vertical threshold is too small compared to the vertical prediction depth, in the specific implementation, when comparing the relative magnitude of the match error of the block to the second horizontal threshold in sequence along the column direction to determine whether there is a decreasing process of the match error of the block, it is easy not to find the block with a match error less than the second vertical threshold, if the second vertical threshold is too large compared to the vertical prediction depth, it tends to reduce the accuracy of the judgment when determining whether there is a decreasing process of match error in the block.

In this embodiment, the second vertical threshold is $k_{low}$ times the vertical prediction depth, where $k_{low} \in (0,1)$, $k_{low} < k_{high}$, and $k_{low}$ is a smaller value of $(0,1)$, that is, $k_{low}$ is a value close to 0. As an example, $k_{low} \in (0,0.5)$.

As an example, the second vertical threshold is set to ¼ of the vertical predication depth.

Figure 9:
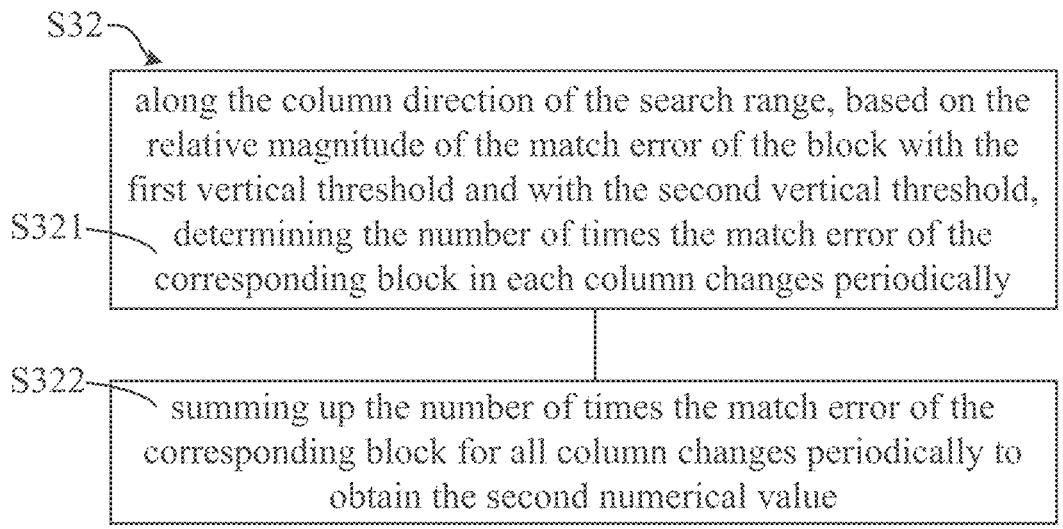
FIG. 9 is a flowchart of an embodiment of step S32 in FIG. 2.

Referring to FIG. 9, a flowchart of an embodiment of step S32 in FIG. 2 is shown. As an example, the steps of obtaining the second numerical comprise the followings:

Executing step S321: along the column direction of the search range, based on the relative magnitude of the match error of the block with the first vertical threshold and with the second vertical threshold, determining the number of times the match error of the corresponding block in each column changes periodically.

In this embodiment, determining the number of times the match error of the corresponding block in each column changes periodically comprises: comparing the relative magnitude of the block match error with the first vertical threshold in turn along the column to determine whether there is an increment process of match error of the block; comparing the relative magnitude of the block match error with the second vertical threshold in turn along the column to determine whether there is a decreasing process of match error of the block; based on the first vertical threshold and the second vertical threshold, marking a process of increasing match error and a process of decreasing match error as a period; obtaining the number of the periods as a number of times the match error changes periodically for the corresponding block of the current column.

Comparing the relative magnitude of the block match error with the first vertical threshold in turn along the column to determine whether there is an increment process of match error of the block, that is, to determine whether the match error of the block has a tendency to increase continuously; comparing the relative magnitude of the block match error with the second vertical threshold in turn along the column to determine whether there is a decreasing process of match error of the block, that is, to determine whether the match error of the block has a tendency to decrease continuously; therefore, an increasing process of match error and a decreasing process of match error can reflect whether the match error of the block along the column direction has a process of "getting smaller and larger" or "getting larger and smaller", and a process of "getting smaller and larger" or "getting larger and smaller" is a period, and by obtaining the number of the periods, it is possible to determine whether the match error of the block of the current column has a process of "getting larger and smaller" or "getting smaller and larger" several times, that is, to determine whether the match error of the block of the current column has been changing periodically.

Regarding the specific description of this embodiment for judging the number of times the match error changes periodically for the corresponding block in each column, the relevant description for judging the number of times the match error changes periodically for the corresponding block in each row can be referred to in the previous description, and will not be repeated here.

Executing step S322: summing up the number of times the match error of the corresponding block for all column changes periodically to obtain the second numerical value.

Compared with taking only the number of match error changes periodically of the corresponding block of a column as the second value, obtaining the second value, i.e., judging the number of match error changes periodically of all columns, by accumulating the number of match error changes periodically of the corresponding blocks of all columns, is conducive to improving the accuracy of judging whether the current central block is located in a periodic scene.

Specifically, based on formula (4.5), summing up the number of times $n_{ihl\_c}$ the match error of the corresponding block for all column changes periodically to obtain the second numerical value $n_{ihl\_c}$, wherein j denotes the current column, sw denotes the number of columns in the search range.

$$n_{ihl\_c} = \sum_{j=0}^{sw} n_{ihl\_j} \tag{4.5}$$

Continuing to referring to FIG. 2, executing step S4: determining whether the current central block is located in a periodic scene or not based on the first numerical value and the second numerical value.

Figure 10:
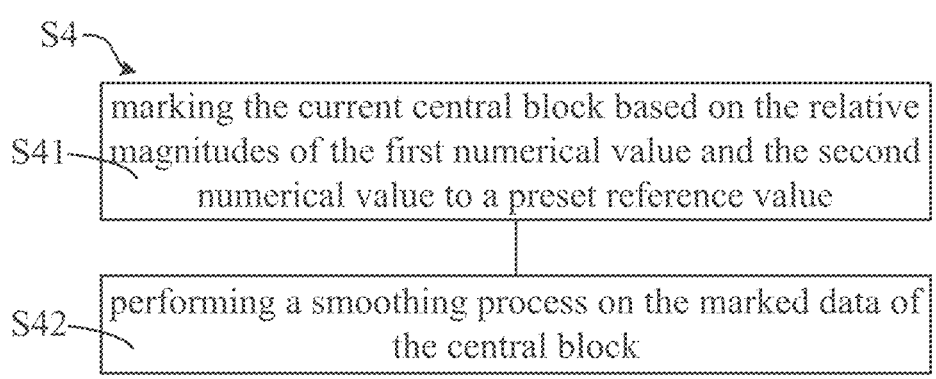
FIG. 10 is a flowchart of an embodiment of step S4 in FIG. 2.

In combination with reference to FIG. 10, a flowchart of an embodiment of step S4 in FIG. 2 is shown. Determining whether the current central block is located in a periodic scene or not based on the first numerical value and the second numerical value comprises:

Executing step S41: marking the current central block based on the relative magnitudes of the first numerical value and the second numerical value to a preset reference value.

Specifically, with reference to formula (5.1), in response to at least one of the first and second values being greater than the preset reference value, marking the current central block as a periodic block, in response to the first and second values being both less than the preset reference value, marking the current central block as a non-periodic block. Wherein nlhl=max(nlhl_r,nlhl_c), th is the preset reference value.

$$flg = \begin{cases} 1, & \text{if}(n_{lhl} > th) \\ 0, & \text{otherwise} \end{cases} \quad (5.1)$$

In a specific implementation, it is possible to reasonably set the preset reference value based on actual circumstances and experience, e.g., when the cycle of a periodic scene is repeated n times in order to be a periodic scene, then the preset reference value th=n.

Continuing to refer to FIG. 10, in this embodiment, determining whether the current central block is located in a periodic scene or not further comprises: after marking the current central block, executing step S42, performing a smoothing process on the marked data of the central block.

By the aforementioned method, it is determined whether a block belongs to the area of a periodic scene or not. Due to the randomness of the whole image, some blocks have the possibility of being misjudged. By smoothing the marked data of the central block to make further judgments on the periodicity of the current block, it is conducive to reducing the probability of misjudgment problems, which in turn makes the periodicity scene of the whole image more full and smooth.

Specifically, the smoothing process comprises: obtaining the marked data of the current central block and the surrounding blocks within the search range of the current central block; in response to the current central block being marked as a non-periodic block, and the number of the surrounding blocks which are marked as periodic block being greater than a first reference value, determining that the current central block is located in a periodic scene and re-marking the current central block as a periodic block; in response to the current central block being marked as a periodic block, and the number of the surrounding blocks which are marked as non-periodic block being less than a second reference value, determining that the current central block is located in a non-periodic scene and re-marking the current central block as a non-periodic block.

As an example, the smoothing process is performed based on formula (5.2).

$$flg(r,c) = \begin{cases} 1, & \text{if} \left( \sum_{i=-1}^{1} \sum_{j=-1}^{1} flg(r+i, c+j) > th_1 \ \& flg(r,c) == 0 \right) \\ 0, & \text{if} \left( \sum_{i=-1}^{1} \sum_{j=-1}^{1} flg(r+i, c+j) < th_2 \ \& flg(r,c) == 1 \right) \end{cases} \quad (5.2)$$

Where flg(r,c) denotes die current block, (r,c) denotes the position of the current block in the whole image, $th_1$ denotes the first reference value, and $th_2$ denotes the second reference value.

It should be noted that $th_1$ and $th_2$ can be equal or different. The larger $th_1$ is, the stricter the condition that flg(r,c)=1. Similarly, the smaller $th_2$ is, the stricter the condition that flg(r,c)=0 is.

As an example, when i=3, j=3, th1=5, th2=3, determining whether the blocks in the search range of 3*3 around the current block are periodic blocks. If more than 5 blocks are periodic, then the current block is also a periodic block; conversely, if there are less than 3 periodic blocks in the specified range, then the current block is a non-periodic block.

Figure 11:
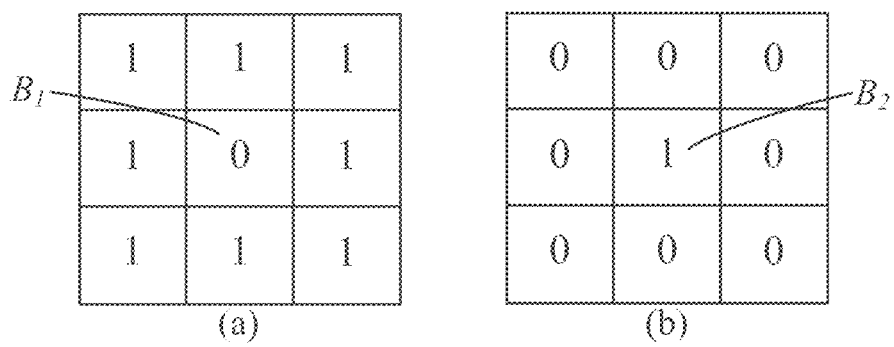
FIG. 11 is a schematic diagram of the method of smoothing process of step S42 in FIG. 10.

Specifically, as an example, in combination with reference to FIG. 11, a schematic diagram of the method of smoothing process of step S42 of FIG. 10 is illustrated.

In FIG. 11(a), the current block B1 is marked as 0, while all surrounding blocks are marked as 1. In other words, all blocks around the current block B1 are periodic blocks, and only the current block B1 is not a periodic block, and this block B1 has a higher probability of being misclassified as a non-periodic block, therefore, marking the current block B1 as a period block as well. The current block B2 in FIG. 11(b) is marked as 1, while all the surrounding blocks are marked as 0. That is, all the blocks around the current block B2 are non-periodic blocks, and only the current block B2 is a periodic block, and this block B2 has a higher probability of being misclassified as a periodic block, so it is changed to a non-periodic block.

By the above method, the isolated periodic blocks in the image are removed and the empty blocks in the periodic foreground area are filled, which helps to improve the smoothness of the image.

Figure 12:
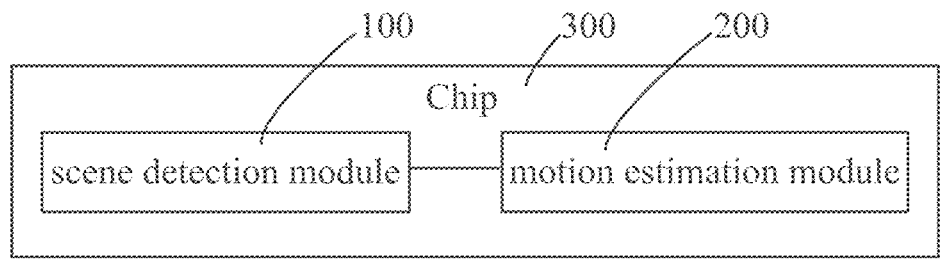
FIG. 12 is a functional block diagram of an embodiment of the chip provided by the present disclosure.

Accordingly, the present disclosure further provides a chip, wherein the chip comprises a scene detection module. Referring to FIG. 12, a functional block diagram of an embodiment of the chip provided by the present disclosure is illustrated, as well as a functional block diagram of an embodiment of the scene detection module of FIG. 12, in conjunction with reference to FIG. 13.

The scene detection module 100 is used for detecting scenes in the current image. Specifically, in this embodiment, the scene detection module 100 is used for detecting periodic scenes in the image.

In this embodiment, the scene detection module 100 comprises: a match error calculation unit 10, used for calculating a match error between a current central block and a surrounding block within a search range centered on the current central block; a depth prediction unit 20, comprising: a horizontal prediction sub-unit 201, used for obtaining a first match error reference maximum value based on the central block along a row direction, and outputting the first match error reference maximum value as a horizontal prediction depth; a vertical prediction sub-unit 202, used for obtaining a second match error reference maximum value based on the central block along a column direction, and outputting the second match error reference maximum value as a vertical prediction depth, a search unit 30, comprising: a setting sub-unit 301, used for setting a first horizontal threshold and a second horizontal threshold based on the horizontal prediction depth, and the first horizontal threshold is greater than the second horizontal threshold, and setting a first vertical threshold and a second vertical threshold based on the vertical prediction depth, and the first vertical threshold is greater than the second vertical threshold; a statistical sub-unit 302, used for judging the number of periodic changes of match error as a first numerical value along the row direction of the search range, based on a relative magnitude of the match error of the block with the first horizontal threshold and with the second horizontal threshold, and judging the number of periodic changes of match error as a second numerical value along the column direction of the search range, based on a relative magnitude of the match error of the block with the first vertical threshold and with the second vertical threshold; a judgment unit 40, used for determining whether the current central block is located in a periodic scene or not based on the first numerical value and the second numerical value.

The match error calculation unit 10 is used for calculating a match error between a surrounding block and a current central block within a search range centered on the current central block.

The match error is used for representing the matching degree between blocks and the similarity between blocks. The more similar the two adjacent blocks are, the smaller the match error is. Specifically, in this embodiment, the match error calculation unit 10 calculates the matching degree between the current central block and the surrounding block.

The match error calculation unit 10 is used for calculating the match error between the surrounding block and the current central block, so that the depth prediction unit 20 is able to obtain a first match error reference maximum value centered on the central block along a row direction, and obtaining a second match error reference maximum value centered on the central block along a column direction based on the match error data calculated by the match error calculation unit 10.

As an example, the match error calculation unit 10 is used for calculating the match error between the surrounding block and the current central block based on the formula (1) in the previous embodiment.

In this embodiment, the match error calculation unit 10 is used for calculating the match error utilizing ABS matching algorithm. Specifically, the ABS matching algorithm can be SAD or SSD, etc.

In other embodiments, the match error calculation unit can calculate the match error between the surrounding blocks and the current central block using other suitable algorithms as well.

It should be noted that in the specific implementation, the size of the search range needs to be set reasonably according to the actual situation, so that the search range can correctly reflect the periodicity of the image.

The more similar the surrounding blocks are to the current central block, the smaller the match error, and conversely, the less similar the surrounding blocks are to the current central block, the larger the match error, therefore, if the central block is located in a periodic scene, the match error between the surrounding blocks and the current central block has a periodically changing process within the search range centered on the current block.

In combination with reference to FIG. 4, wherein FIG. 4(*a*), FIG. 4(*b*), and FIG. 4(*c*) illustrate images of block match error functions corresponding to some periodic scenes. From the image illustrated in FIG. 4, it can be seen that the block match error surface corresponding to periodic scenes has multiple "V"-like shapes in at least one direction, i.e., it has a periodic "V"-like shape in at least one direction, reflecting the periodic scene corresponding to the block match error with periodic changes in the process.

The horizontal prediction sub-unit 201 is used for obtaining a first match error reference maximum value based on the central block along a row direction, and outputting the first match error reference maximum value as a horizontal prediction depth.

The horizontal prediction depth is used as a reference value for the subsequent setting of the first horizontal threshold and the second horizontal threshold.

As an example, combined with the reference FIG. 4(*c*), in this embodiment, the horizontal prediction depth is the depth D of the "V" shape in the image, which is the difference between the first match error reference maximum value and the match error at the current central block position. Since the match error at the current central block position is zero, which is the lowest match error point, the first match error reference maximum value is the depth D of "V" shape.

Figure 13:
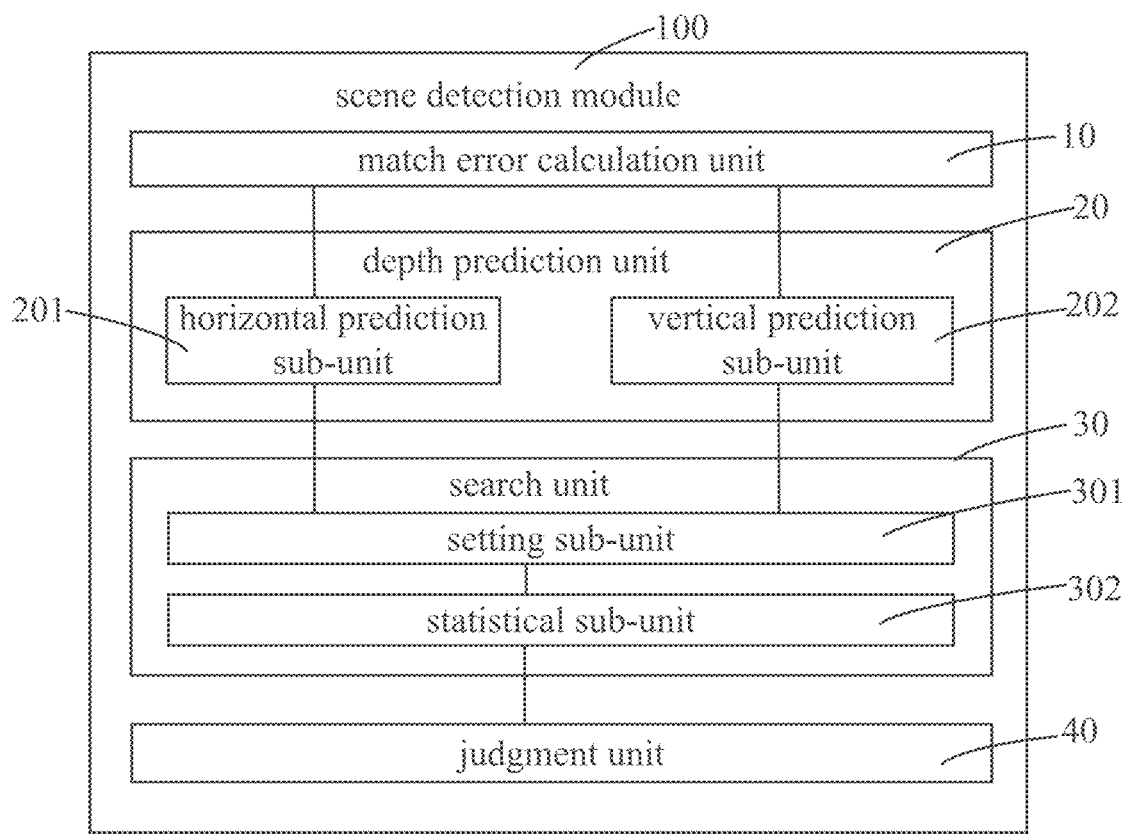
FIG. 13 is a functional block diagram of an embodiment of the scene detection module of FIG. 12.
Figure 14:
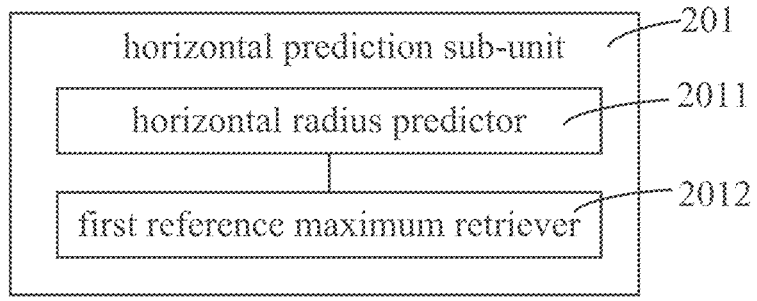
FIG. 14 is a functional block diagram of an embodiment of the horizontal prediction sub-unit of FIG. 13.

In conjunction with reference to FIG. 14, a functional block diagram of an embodiment of the horizontal prediction subunit of FIG. 13 is shown.

The horizontal prediction sub-unit 201 comprises: a horizontal radius predictor 2011, used for obtaining a first number of blocks with successively increasing match errors based on the central block along the row direction, and outputting the first number of blocks as a horizontal prediction radius.

The match error of the current central block is zero, the current central block is the minimum match error point, and the similarity between the surrounding blocks of the current central block and the current central block gradually decreases along the first horizontal direction of the row direction or along the second horizontal direction of the row direction from the current central block, therefore, from the first horizontal direction of the current central block along the row direction or the second horizontal direction along the row direction, the match error between the surrounding blocks and the current central block is also increasing. If the search range centered on the current central block is a periodic scene, the match error between the surrounding blocks and the current central block increases continuously in the first horizontal direction or in the second horizontal direction from the current central block until the match error reaches a maximum at a certain block, and then gradually decreases in the process of approaching the repeating block in the next period corresponding to the current central block until the match error readies a minimum again at the position of the repeating block searched in the next period corresponding to the current central block.

Therefore, in this embodiment, the horizontal prediction radius refers to: from the current central block toward the first horizontal direction along the row direction or toward the second horizontal direction along the row direction, the match error increases continuously to a certain block when it no longer increases continuously, and the distance between that block and the current central block along the row direction is the horizontal prediction radius. With reference to FIG. 4(*c*), in this embodiment, the horizontal prediction radius refers to the horizontal distance r between the lowest and highest points of the "V" shape.

Accordingly, in this embodiment, by obtaining a first number of blocks with successively increasing match error as the horizontal prediction radius, it is subsequently possible for first reference maximum retriever 2012 to obtain a first match error reference maximum value along the row direction based on the horizontal prediction radius.

As an example, the first horizontal direction along the row direction is the direction to the left from the current central block, and the second horizontal direction along the row direction is the direction to the right from the current central block.

Specifically, in this embodiment, based on formula (2.1), the horizontal radius predictor 2011 obtains the number of blocks with successively increasing match errors from the current central block along a first horizontal direction of the row as a first horizontal prediction number of blocks $r_{left}$; based on formula (2.2), the horizontal radius predictor 2011 obtains the number of blocks with successively increasing match errors from the current central block along a second horizontal direction of the row as a second horizontal prediction number of blocks $r_{right}$; based on formula (2.3), and taking a smaller of the first horizontal prediction number of blocks and the second horizontal prediction number of blocks as the first number of blocks $r_1$, where the first number of blocks $r_1$ is used as the horizontal prediction radius.

In specific implementation, the first horizontal prediction number of blocks $r_{left}$ and the second horizontal prediction number of blocks $r_{right}$ are not necessarily the same, the horizontal radius predictor 2011 helps to reduce the probability of misjudgment and improve the accuracy of the first match error reference extreme value by taking the smaller $\min(r_{left}, r_{right})$ of the horizontal prediction number of blocks $r_{left}$ and the second horizontal prediction number of blocks $r_{right}$ as the first number of blocks $r_1$, and correspondingly improving the accuracy of determining whether the current central block is located in the periodic scene.

The horizontal prediction sub-unit 201 further comprises: a first reference maximum retriever 2012, used for obtaining the match error of the block corresponding to the horizontal prediction radius at a distance from the central block along the row direction, and outputting the match error as the first match error reference maximum value.

The block corresponding to the central block with the distance along the row direction as the horizontal prediction radius is the block with successively increasing match error based on the central block in the first horizontal direction along the row or in the second horizontal direction along the row, so that the match error of the block corresponding to the central block with the distance along the row direction as the horizontal prediction radius is the maximum point along the row direction, which is the highest point of the "V" shape in FIG. 4(c), and can be used as the first match error reference extreme value, i.e. the horizontal prediction depth. Accordingly, the first horizontal threshold and the second horizontal threshold set by the setting sub-unit 301 in the search unit 30 based on the horizontal prediction depth, can be used as a benchmark for determining whether the match error has a "V" shape along the row direction.

Specifically, in this embodiment, the first reference maximum retriever 2012 is used for obtaining a first match error $error_{0,-r_1}$ corresponding to the block located on one side of the central block along the row direction and at a distance from the central block with the horizontal prediction radius $r_1$, and obtaining a second match error $error_{0,r_1}$ corresponding to the block located on the other side of the central block along the row direction and at a distance from the central block with the horizontal prediction radius $r_1$; Combined with the reference formula (2.4) in the previous embodiment, taking the smaller $\min(error_{0,-r_1}, error_{0,r_1})$ of the first match error $error_{0,-r_1}$ and the second match error $error_{0,r_1}$ as the first match error reference maximum value $D_1$.

The vertical prediction sub-unit 202 is used for obtaining a second match error reference maximum value based on the central block along a column direction, and outputting the second match error reference maximum value as a vertical prediction depth.

The vertical prediction depth is used as a reference value for the subsequent setting of the first vertical threshold and the second vertical threshold.

Figure 15:
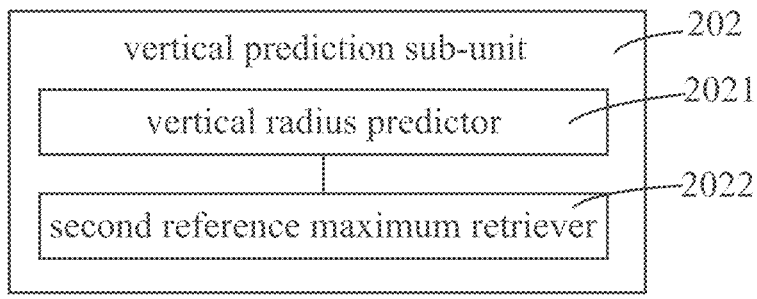
FIG. 15 is a functional block diagram of an embodiment of the vertical prediction sub-unit of FIG. 13.

In conjunction with reference to FIG. 15, a functional block diagram of an embodiment of the vertical prediction sub-unit 202 of FIG. 13 is shown. The vertical prediction sub-unit 202 comprises: a vertical radius predictor 2021, for obtaining a second number of blocks with successively increasing match errors based on the central block along the column direction, and outputting the second number of blocks as a vertical prediction radius.

The match error of the current central block is zero, the current central block is the minimum match error point, and the similarity between the surrounding blocks of the current central block and the current central block gradually decreases along the first vertical direction of the column direction or along the second vertical direction of the column direction from the current central block, therefore, from the first vertical direction of the current central block along the column direction or the second vertical direction along the column direction, the match error between the surrounding blocks and the current central block is also increasing. If the search range centered on the current central block is a periodic scene, the match error between the surrounding blocks and the current central block increases continuously in the first vertical direction or in the second vertical direction from the current central block until the match error reaches a maximum at a certain block, and then gradually decreases in the process of approaching the repeating block in the next period corresponding to the current central block until the match error reaches a minimum again at the position of the repeating block searched in the next period corresponding to the current central block.

Therefore, in this embodiment, the vertical prediction radius refers to: from the current central block toward the first vertical direction along the column direction or toward the second vertical direction along the column direction, the match error increases continuously to a certain block when it no longer increases continuously, and the distance between that block and the current central block along the column direction is the vertical prediction radius.

Accordingly, in this embodiment, the vertical radius predictor 2021 obtains the second number of blocks with successively increasing match errors along the column direction, and the output is the vertical prediction radius, so that second reference maximum retriever 2022 is able to obtain a second match error reference maximum value along the column direction based on the vertical prediction radius.

As an example, the first vertical direction along the column direction is the upward direction from the current block, and the second vertical direction along the column direction is the downward direction from the current block.

Specifically, in this embodiment, the vertical radius predictor 2021 is used for obtaining the number of blocks with successively increasing match error from the current central block along a first vertical direction of the column according to formula (3.2) in the previous embodiment, outputting as the first vertical prediction number of blocks $r_{up}$, and for obtaining the number of blocks with successively increasing match error from the current central block along a second vertical direction of the column according to formula (3.2) in the previous embodiment, outputting as the second vertical prediction number of blocks $r_{down}$, and for outputting the smaller $\min(r_{up}, r_{down})$ of the first vertical prediction number of blocks $r_{up}$ and the second vertical prediction number of blocks $r_{down}$ as the second number of blocks $r_2$.

In specific implementation, the first vertical prediction number of blocks $r_{up}$ and the second vertical prediction number of blocks $r_{down}$ are not necessarily the same, the vertical radius predictor 2021 helps to reduce the probability of misjudgment and improve the accuracy of the second match error reference extreme value by taking the smaller min($r_{up}$,$r_{down}$) of the first vertical prediction number of blocks $r_{up}$ and the second vertical prediction number of blocks $r_{down}$ as the first number of blocks $r_2$, and correspondingly improving the accuracy of determining whether the current central block is located in the periodic scene.

The vertical prediction sub-unit 202 further comprises: a second reference maximum retriever 2022, used for obtaining the match error of the block corresponding to the vertical prediction radius at a distance from the central block along the column direction as the second match error reference maximum value, and outputting the match error as the second match error reference maximum value.

The block corresponding to the central block with the distance along the column direction as the vertical prediction radius is the block with successively increasing match error based on the central block in the first vertical direction along the column or in the second vertical direction along the column, so that the match error of the block corresponding to the central block with the distance along the column direction as the vertical prediction radius is the maximum point along the column direction, which is the highest point of the "V" shape, and can be used as the second match error reference extreme value, i.e. the vertical prediction depth. Accordingly, the first vertical threshold and the second vertical threshold set by the setting sub-unit 301 in the search unit 30 based on the vertical prediction depth, can be used as a benchmark for determining whether the match error has a "V" shape along the column direction.

Specifically, in this embodiment, the second reference maximum retriever 2022 is used for obtaining a third match error $error_{-r_2,0}$ corresponding to the block located on one side of the central block along the column direction and at a distance from the central block with the vertical prediction radius $r_2$, and obtaining a fourth match error $error_{r_2,0}$ corresponding to the block located on the other side of the central block along the column direction and at a distance from the central block with the vertical prediction radius $r_2$, and outputting a smaller min($error_{-r_2,0}$,$error_{r_2,0}$) of the third match error $error_{-r_2,0}$ and the fourth match error $error_{r_2,0}$ as the second match error reference maximum value $D_2$ based on formula (3.4) in previous embodiment.

A periodic scene is one in which the block match error exhibits a geometric periodicity within a specified region. The embodiments of the present disclosure are able to analyze whether the similarity of the corresponding block along the row direction to the current central block changes periodically and the number of times it changes periodically as a first value by setting a first horizontal threshold and a second horizontal threshold based on the horizontal prediction depth and judging the number of times the match error along the search range row direction based on the relative magnitude of the match error of the block to the first horizontal threshold and the second horizontal threshold. Accordingly, the embodiments of the present disclosure can determine whether the current central block is located in the periodic scene based on the first value, so that subsequent motion estimation can be performed based on the periodic pattern of the scene, which is conducive to reducing the probability of deviations in motion estimation resulting in problems such as broken lines, improving the accuracy of motion estimation, which in turn is conducive to improving the image quality of the motion scene.

The setting sub-unit 301 is used for setting a first horizontal threshold and a second horizontal threshold based on the horizontal prediction depth, and the first horizontal threshold is greater than the second horizontal threshold.

The first horizontal threshold is used as a high reference threshold $th_{high}$, so that the statistical sub-unit 302 is able to compared a relative magnitude of the match error of the block with the first horizontal threshold in turn along the row direction to determine whether the match error of the block has an incremental process, that is, to determine whether the match error of the block has an incremental trend.

In this embodiment, the first horizontal threshold $th_{high}=k_{high}*D_1$, where $k_{high}\in(0,1)$, and $k_{high}$ is a larger value of (0,1), that is, $k_{high}$ is a value close to 1. As an example, $k_{high}\in(0.5,1)$.

As an example, the first horizontal threshold is set to ¾ of the horizontal predication depth.

The second horizontal threshold is less than the first horizontal threshold, and the second horizontal threshold is used as a low reference threshold, the subsequent process of comparing a relative magnitude of the match error of the block with the second horizontal threshold in turn along the row direction to determine whether the match error of the block has a decreasing process, that is, to determine whether the match error of the block has an decreasing trend.

In this embodiment, the second horizontal threshold $th_{low}=k_{low}*D_1$, where $k_{low}\in(0,1)$, $k_{low}<k_{high}$, and $k_{low}$ is a smaller value of (0,1), that is, $k_{low}$ is a value close to 0. As an example, $k_{low}\in(0,0.5)$.

As an example, the second horizontal threshold is set to ¼ of the horizontal predication depth.

The setting sub-unit 301 is also used for setting a first vertical threshold and a second vertical threshold based on the vertical prediction depth, and the first vertical threshold is greater than the second vertical threshold.

The first vertical threshold is used as a high reference threshold $th_{high}$, and the statistical sub-unit is able to compare a relative magnitude of the match error of the block with the first vertical threshold in turn along the column direction to determine whether the match error of the block has an incremental process, that is, to determine whether the match error of the block has an incremental trend.

In this embodiment, the first vertical threshold is set to $k_{high}$ times the vertical prediction depth, where $k_{high}\in(0,1)$, and $k_{high}$ is a larger value of (0,1), that is, $k_{high}$ is a value close to 1. As an example, $k_{high}\in(0.5,1)$.

As an example, the first vertical threshold is set to ¾ of the vertical predication depth.

The second vertical threshold is less than the first vertical threshold, and the second vertical threshold is used as a low reference threshold, so that the statistical sub-unit 302 is able to compare a relative magnitude of the match error of the block with the second vertical threshold in turn along the column direction to determine whether ihe match error of the block has a decreasing process, that is, to determine whether the match error of the block has an decreasing trend.

In this embodiment, the second vertical threshold is $k_{low}$ times the vertical prediction depth where $k_{low}\in(0,1)$, $k_{low}<k_{high}$, and $k_{low}$ is a smaller value of (0,1), that is, $k_{low}$ is a value close to 0. As an example, $k_{low}\in(0,0.5)$.

As an example, the second vertical threshold is set to ¼ of the vertical predication depth.

The statistical sub-unit 302 is used for judging the number of periodic changes of match error as a first numerical value along the row direction of the search range, based on a relative magnitude of the match error of the block with the first horizontal threshold and with the second horizontal threshold, and judging the number of periodic changes of match error as a second numerical value along the column direction of the search range, based on a relative magnitude of the match error of the block with the first vertical threshold and with the second vertical threshold.

A functional block diagram of an embodiment of the statistics sub-unit 302 of FIG. 13 is illustrated with reference to FIG. 16. As an example, the statistical sub-unit 302 comprises: a row counter 3021, used for determining a number of times the match error of the corresponding block in each row changes periodically, based on the relative magnitude of the match error of the block with the first horizontal threshold and with the second horizontal threshold; a row accumulator 3022, used for summing up the number of times the match error of the corresponding block for all row changes periodically to obtain the first numerical value.

Figure 16:
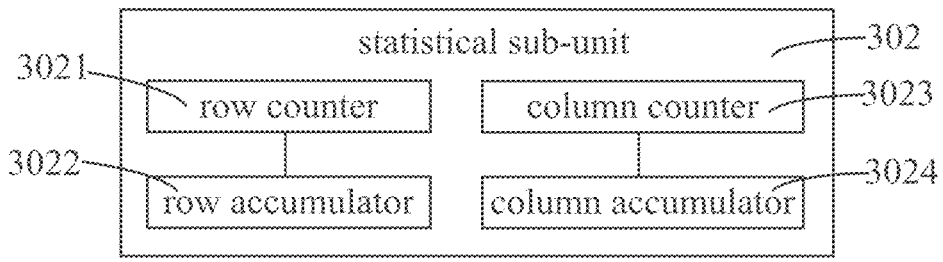
FIG. 16 is a functional block diagram of an embodiment of the statistical sub-unit of FIG. 13.
Figure 17:
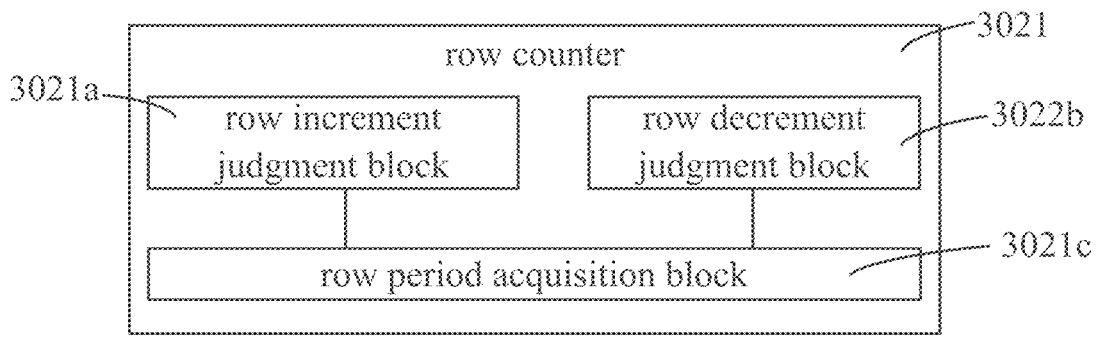
FIG. 17 is a functional block diagram of an embodiment of the row counter of FIG. 16.

In conjunction with reference to FIG. 17, a functional block diagram of an embodiment of the row counter 3021 of FIG. 16 is shown.

As an example, the row counter 3021 comprises: a row increment judgment block 3021a, used for comparing the relative magnitude of the block match error with the first horizontal threshold in turn along the row to determine whether there is an incremental process of match error of the block; a row decrement judgment block 3021b, used for comparing the relative magnitude of the block match error with the second horizontal threshold in turn along the row to determine whether there is a decreasing process of match error of the block; a row period acquisition block 3021c, used for marking a process of increasing match error and a process of decreasing match error as a period based on the first horizontal threshold and the second horizontal threshold, and obtaining the number of the periods as a number of times the match error changes periodically for the corresponding block of the current row.

Comparing the relative magnitude of the block match error with the first horizontal threshold in turn along the row to determine whether there is an incremental process of match error of the block, that is, to determine whether the match error of the block has a tendency to increase continuously, comparing the relative magnitude of the block match error with the second horizontal threshold in turn along the row to determine whether there is a decreasing process of match error of the block, that is, to determine whether the match error of the block has a tendency to decrease continuously, therefore, an increasing process of match error and a decreasing process of match error can reflect whether the match error of the block along the row direction has a process of "getting smaller and larger" or "getting larger and smaller", and a process of "getting smaller and larger" or "getting larger and smaller" is a period, and by obtaining the number of the periods, it is possible to determine whether the match error of the block of the current row has a process of "getting larger and smaller" or "getting smaller and larger" several times, that is, to determine whether the match error of the block of the current row has been changing periodically.

The Row counter 3021 takes the first block in the search range of a row as the initial position. At the initial position, the number of times the match error changes periodically for the corresponding block of the current row is zero.

The row counter 3021 is also used for determining whether the match error of the current surrounding block is less than the second horizontal threshold based on the formula (4.2). Determining whether the match error of the current surrounding block is less than the second horizontal threshold, that is, determining whether the current surrounding block is a block close to the minimal value of the match error.

If the match error of the current surrounding block is greater than the second horizontal threshold, the row counter 3021 determines whether the match error of the next block of the current row is less than the second horizontal threshold.

If the match error of the current surrounding block is less than the second horizontal threshold, the row counter 3021 determines whether the match error of the current surrounding block is greater than the first horizontal threshold based the formula (43) in the previous embodiment.

Determining whether the match error of the current surrounding block is less than the second horizontal threshold, when the match error of the current surrounding block is greater than the second horizontal threshold, the process of determining whether the match error of the next block of the current row is less than the second horizontal threshold until the match error of the current surrounding blocks is less than the second horizontal threshold, that is, the process of determining whether there is a decreasing match error of the blocks.

Determining whether the match error of the current surrounding block is greater than the first horizontal threshold, that is, determining whether the current surrounding block is a block with a match error close to the maximum value.

When the match error of the current surrounding block is less than or equal to the first horizontal threshold, the row counter 3021 determines whether the match error of the next block in the current row is greater than the first horizontal threshold.

When the match error of the current surrounding block is greater than the first horizontal threshold, the row counter 3021 counts the number of times the match error changes periodically for the corresponding block in the current row.

Wherein the process of determining whether the match error of the current surrounding block is greater than first horizontal threshold, and the process of determining whether the match error of the next block in the current row is greater than first horizontal threshold when the match error of the current surrounding block is less than or equal to first horizontal threshold, until the match error of the current surrounding block is greater than the second level threshold, that is, the process of determining whether there is an incremental match error of the blocks.

When the match error of the current surrounding block is greater than first horizontal threshold, that is, there is a process of increasing match error and a process of decreasing match error for the block of the current row, marking a process of increasing match error and a process of decreasing match error as a period, therefore, counting the number of times the match error changes periodically for the corresponding block in the current row.

It is to be noted that this embodiment uses as an example to first determine whether the match error of the current surrounding block is less than second horizontal threshold, and then determine whether the match error of the current surrounding block is greater than the first horizontal threshold. In other embodiments, it is also possible to determine whether the match error of the current surrounding block is greater than first horizontal threshold, and then determine whether the match error of the current surrounding block is less than the second horizontal threshold.

After counting the number of times the match error changes periodically for the corresponding block in the current row, the row counter 3021 returns to determining whether the match error for the next block of the current row is less than second horizontal threshold.

By returning to determining whether the match error of the next block of the current row is less than the second horizontal threshold, that is, continuing the process of determining whether there is a repeated match error increment and decrement for the remaining blocks of the current row within the search range, each time a match error increment process and a match error decrement process are judged, the number of times the match error changes for the corresponding block of the current row is counted until the last block of the current row in the search range is judged, and the number of times the match error changes periodically for the corresponding block of the current row is obtained.

The row accumulator 3022 is used for summing up the number of times the match error of the corresponding block for all row changes periodically to obtain the first numerical value.

Compared with taking only the number of match error changes periodically of the corresponding block of a row as the second value, the row accumulator 3022 obtains the second value by accumulating the number of match error changes periodically of the corresponding blocks of all rows, i.e., the number of match error changes periodically for all rows is judged, which is conducive to improving the accuracy of judging whether the current central block is located in a periodic scene.

Specifically, based on formula (4.4) in the previous embodiment, summing up the number of times $n_{jhl\_r}$ the match error of the corresponding block for all row changes periodically to obtain the first numerical value $n_{jhl\_r}$.

Combined with reference to FIG. 16, the statistical sub-unit 302 further comprises: a column counter 3023, used for determining the number of times the match error of the corresponding block in each column changes periodically along the column direction of the search range, based on the relative magnitude of the match error of the block with the first vertical threshold and with the second vertical threshold, a column accumulator 3024, used for summing up the number of times the match error of the corresponding block for all column changes periodically to obtain the second numerical value.

In specific implementations, the block match error corresponding to periodic scenarios may changes periodically along only one direction (row direction or column direction), in this embodiment, the search unit 30 determines the number of times the match error changes periodically not only along the search range row direction based on the relative magnitude of the match error of the block to the first horizontal threshold and the second horizontal threshold, but also along the search range column direction based on the relative magnitude of the match error of the block to the first vertical threshold and the second vertical threshold, and the row direction is perpendicular to the column direction, compared with judging the number of periodic changes in match error along only one of the directions of the search range, judging the number of periodic changes in match error along both row and column directions helps prevent the situation where the direction of periodic changes in block match error is perpendicular to the direction of search judgment, which leads to missed or misjudged periodic scenes, thus improving the accuracy of subsequent judgment of periodic scenes.

Figure 18:
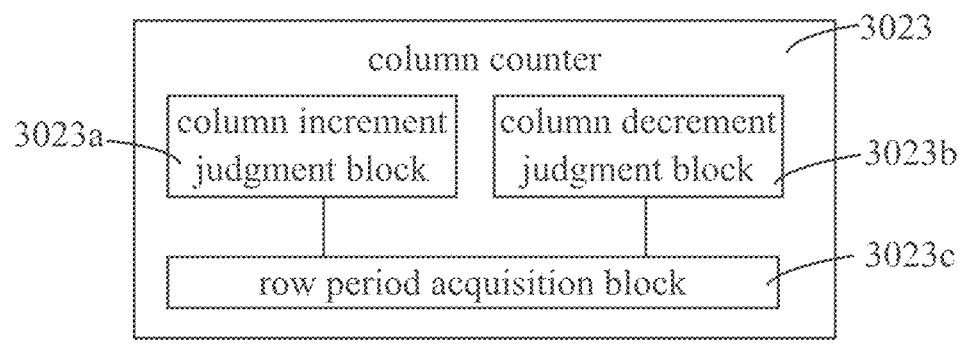
FIG. 18 is a functional block diagram of an embodiment of the column counter of FIG. 16.

In conjunction with reference to FIG. 18, a schematic diagram of an embodiment of the column counter of FIG. 16 is shown. As an example, the column counter 3023 comprises: a column increment judgment block 3023a, used for comparing the relative magnitude of the block match error with the first vertical threshold in turn along the column to determine whether there is an increment process of match error of the block; a column decrement judgment block 3023b, used for comparing the relative magnitude of the block match error with the second vertical threshold in turn along the column to determine whether there is a decreasing process of match error of the block; a row period acquisition block 3023c, used for marking a process of increasing match error and a process of decreasing match error as a period based on the first vertical threshold and the second vertical threshold, and obtaining the number of the periods as a number of times the match error changes periodically for the corresponding block of the current column.

Comparing the relative magnitude of the block match error with the first vertical threshold in turn along the column to determine whether there is an increment process of match error of the block, that is, to determine whether the match error of the block has a tendency to increase continuously; comparing the relative magnitude of the block match error with the second vertical threshold in turn along the column to determine whether there is a decreasing process of match error of the block, that is, to determine whether the match error of the block has a tendency to decrease continuously: therefore, an increasing process of match error and a decreasing process of match error can reflect whether the match error of the block along the column direction has a process of "getting smaller and larger" or "getting larger and smaller", and a process of "getting smaller and larger" or "getting larger and smaller" is a period, and by obtaining the number of the periods, it is possible to determine whether the match error of the block of the current column has a process of "getting larger and smaller" or "getting smaller and larger" several times, that is, to determine whether the match error of the block of the current column has been changing periodically.

Regarding the specific description of this embodiment for judging the number of times the match error changes periodically for the corresponding block in each column, the relevant description for judging the number of times the match error changes periodically for the corresponding block in each row can be referred to in the previous description, and will not be repeated here.

The column accumulator 3024 is used for summing up the number of times the match error of the corresponding block for all column changes periodically to obtain the second numerical value. Compared with taking only the number of match error changes periodically of the corresponding block of a column as the second value, obtaining the second value, i.e., judging the number of match error changes periodically of all columns, by accumulating the number of match error changes periodically of the corresponding blocks of all columns, is conducive to improving the accuracy of judging whether the current central block is located in a periodic scene.

Specifically, the column accumulator 3024 sums up the number of times $n_{jhi\_c}$ the match error of the corresponding block for all column changes periodically to obtain the second numerical value based on formula (4.5) in the previous embodiment.

The judgment unit 40 is used for determining whether the current central block is located in a periodic scene or not based on the first numerical value and the second numerical value.

Figure 19:
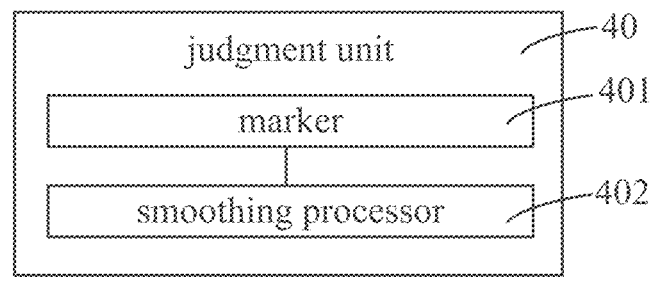
FIG. 19 is a functional block diagram of an embodiment of the judgment unit of FIG. 13.

In conjunction with reference to FIG. 19, a schematic diagram of an embodiment of the judgment unit 40 of FIG. 13 is shown. As an example, the judgment unit 40 comprises: a marker 401, used for marking the current central block based on the relative magnitudes of the first numerical value and the second numerical value to a preset reference value; the marker 401 is used for marking the current central block as a periodic block in response to at least one of the first and second values being greater than the preset reference value; and the marker is also used for marking the current central block as a non-periodic block in response to the first and second values being both less than the preset reference value.

Specifically, with reference to formula (5.1) in the previous embodiment, in response to at least one of the first and second values is greater than the preset reference value, marking the current central block as a periodic block; in response to the first and second values are both less than the preset reference value, marking the current central block as a non-periodic block. Wherein nlhl=max(nlhl_r,nlhl_c), th is the preset reference value.

In a specific implementation, it is possible to reasonably set the preset reference value based on actual circumstances and experience, e.g., when the cycle of a periodic scene is repeated n times in order to be a periodic scene, then the preset reference value th=n.

In this embodiment, the judgment unit 40 further comprises: a smoothing processor 402, used for performing a smoothing process on the marked data of the central block output by the marker 401.

It is determined whether a block belongs to the area of a periodic scene or not. Due to the randomness of the whole image, some blocks have the possibility of being misjudged, by smoothing the marked data of the central block to make further judgments on the periodicity of the current block, it is conducive to reducing the probability of misjudgment problems, which in turn makes the periodicity scene of the whole image more full and smooth.

Figure 20:
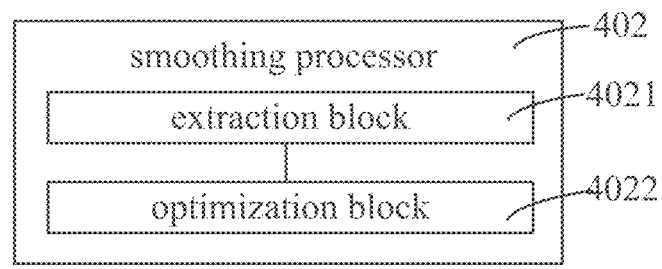
FIG. 20 is a functional block diagram of an embodiment of the smoothing processor of FIG. 19.

In conjunction with reference to FIG. 20, a schematic diagram of an embodiment of the smoothing processor 402 of FIG. 19 is shown.

Specifically, the smoothing processor 402 comprises: an extraction block 4021, used for obtaining the marked data of the current central block and the surrounding blocks within the search range of the current central block; an optimization block 4022, used for determining that the current central block is located in a periodic scene and re-marking the current central block as a periodic block in response to the current central block being marked as a non-periodic block, and the number of the surrounding blocks which are marked as periodic block being greater than a first reference value; and the optimization block is also used for determining that the current central block is located in a non-periodic scene and re-marking the current central block as a non-periodic block in response to the current central block being marked as a periodic block, and the number of the surrounding blocks which are marked as non-periodic block being less than a second reference value.

The smoothing processor 402 is able to remove isolated periodic blocks from the image and fills the empty blocks in the periodic foreground area, which helps to improve the smoothness of the image.

Continuing with reference to FIG. 12, the chip 300 further comprises: a motion estimation module 200, used for performing motion estimation for the corresponding blocks which is located a periodic scene detected by the scene detection module 100.

The motion estimation module 200 is able to perform motion estimation according to the periodic pattern of the scene, which is conducive to reducing the probability of deviations in motion estimation resulting in problems such as broken lines, improving the accuracy of motion estimation, which in turn is conducive to improving the image quality of the motion scene, correspondingly improving the audio and video processing capability of Chip 300.

In this embodiment, the chip 300 can be a multimedia chip, an audio and video chip, a video processing chip, a MEMC (Motion Estimation and Motion Compensation) chip and the like.

The chip 300 provide by the embodiment of the disclosure comprises the scene detection module 100 and the motion estimation module 200, which is beneficial to improving the audio and video processing capability of the chip, thereby facilitating optimizing the visual experience of the user and improving the user experience.

Chip 300 in an embodiment of the present disclosure can be implemented by a digital logic circuit, each of which is used by a logic operation to perform the method mentioned in the previous corresponding embodiment. Alternatively, the chip 300 May be implemented by a general-purpose processor that runs the relevant motion estimation methods by executing a computer software program.

Correspondingly, the embodiments of the disclosure also provides an electronic device, which comprises the chip 300 provided by the embodiment of the disclosure.

In this embodiment, the electronic device is a device capable of performing video image processing, such as a set-top box or a display device. The display device can be a television, a projector, a mobile phone and the like.

According to the embodiments provided above, the chip 300 provided by the embodiment of the disclosure has high audio-video processing capability, so that the video fluency and smoothness of the electronic device can be improved, which is conducive to improving the user's perception and providing the user with a higher visual experience.

Correspondingly, the embodiments of the disclosure also provides a storage medium, wherein the storage medium stores one or more computer instructions, and the one or more computer instructions are used for implementing the scene detection method provided by the embodiment of the disclosure.

The storage medium is a computer-readable storage medium, and the storage medium may be a read-only memory (ROM), a random access memory (RAM), a U-disk, a mobile hard disk, a magnetic disk or an optical disk and the like.

Embodiments of the disclosure described above are combinations of elements and features of the present disclosure. Unless otherwise noted, the elements or features may be regarded as selective. The various elements or features may be practiced without being combined with other elements or features. In addition, embodiments of the present disclosure may be constructed by combining part of elements and/or features. The sequence of operations described in the embodiments of the present disclosure may be rearranged. Some configurations of any of the embodiments may be included in another embodiment and replaced with corresponding configurations of another embodiment. It will be apparent to those skilled in the art that the claims that do not explicitly refer to each other in the appended claims may be combined with embodiments of the disclosure, or may be included as new claims in the modification following the filing of this application.

Embodiments of the disclosure may be implemented by various means such as hardware, firmware, software, or a combination thereof. In a hardware configuration, a method according to an exemplary embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In firmware or software configurations, embodiments of the present disclosure may be implemented in the form of modules, processes, functions, and the like. The software code may be stored in the memory unit and executed by the processor. The memory unit is internal or external to the processor and can send data to and receive data from the processor via various known means.

Although the present disclosure is disclosed as above, the present disclosure is not limited thereto. Those skilled in the art can make various changes and modifications without departing from the spirit and scope of the present disclosure. Therefore, the scope of the present disclosure should be accorded the scope defined by the claims.

What is claimed is:

1. A scene detection method, comprising:
   calculating a block match error between a current central block and a surrounding block within a search range centered on the current central block;
   obtaining a first match error reference maximum value based on the current central block along a row direction as a horizontal prediction depth;
   obtaining a second match error reference maximum value based on the current central block along a column direction as a vertical prediction depth;
   setting a first horizontal threshold and a second horizontal threshold based on the horizontal prediction depth, where the first horizontal threshold is greater than the second horizontal threshold;
   along the row direction of the search range, and based on a comparison of a relative magnitude of the block match error with the first horizontal threshold and with the second horizontal threshold, determining a first number of periodic changes of the block match error as a first numerical value;
   setting a first vertical threshold and a second vertical threshold based on the vertical prediction depth, where the first vertical threshold is greater than the second vertical threshold;
   along the column direction of the search range, and based on a comparison of a relative magnitude of the block match error with the first vertical threshold and with the second vertical threshold, determining a second number of periodic changes of the block match error as a second numerical value; and
   determining whether the current central block is located in a periodic scene or not based on the first numerical value and the second numerical value by at least:
   marking the current central block based on the relative magnitudes of the first numerical value and the second numerical value to a preset reference value;
   in response to at least one of the first and second values being greater than the preset reference value, marking the current central block as a periodic block; and
   in response to both the first and second values being less than the preset reference value, marking the current central block as a non-periodic block.

2. The scene detection method of claim 1, wherein:
   obtaining the first match error reference maximum value comprises:
      obtaining a first number of blocks with successively increasing block match errors based on the current central block along the row direction as a horizontal prediction radius; and
      obtaining the block match error of a block corresponding to the horizontal prediction radius at a distance from the current central block along the row direction as the first match error reference maximum value; and
   obtaining the second match error reference maximum value comprises:
      obtaining a second number of blocks with successively increasing block match errors based on the current central block along the column direction as a vertical prediction radius; and
      obtaining the block match error of a block corresponding to the vertical prediction radius at a distance from the current central block along the column direction as the second match error reference maximum value.

3. The scene detection method of claim 2, wherein:
   obtaining the horizontal prediction radius comprises:
      obtaining a third number of blocks with successively increasing block match errors from the current central block along a first horizontal direction of the row as a first horizontal prediction number of blocks;
      obtaining a fourth number of blocks with successively increasing block match errors from the current central block along a second horizontal direction of the row as a second horizontal prediction number of blocks; and
      taking a smaller of the first horizontal prediction number of blocks and the second horizontal prediction number of blocks as the first number of blocks; and
   obtaining the vertical prediction radius comprises:
      obtaining a fifth number of blocks with successively increasing block match errors from the current central block along a first vertical direction of the column as a first vertical prediction number of blocks;
      obtaining a sixth number of blocks with successively increasing block match errors from the current central block along a second vertical direction of the column as a second vertical prediction number of blocks; and
      taking a smaller of the first vertical prediction number of blocks and the second vertical prediction number of blocks as the second number of blocks.

4. The scene detection method of claim 2, wherein:
   obtaining the first number of blocks with successively increasing block match errors based on the current central block along the row direction as the horizontal prediction radius comprises:
      obtaining a first match error corresponding to a first block located on one side of the current central block along the row direction and at a distance from the current central block with the horizontal prediction radius;
      obtaining a second match error corresponding to a second block located on the other side of the current central block along the row direction and at a distance from the current central block with the horizontal prediction radius; and
      taking a smaller of the first match error and the second match error as the first match error reference maximum value; and
   obtaining the second number of blocks with successively increasing block match errors based on the current central block along the column direction as the vertical prediction radius comprises:
obtaining a third match error corresponding to a third block located on one side of the current central block along the column direction and at a distance from the current central block with the vertical prediction radius;
obtaining a fourth match error corresponding to a fourth block located on the other side of the current central block along the column direction and at a distance from the current central block with the vertical prediction radius; and
taking a smaller of the third match error and the fourth match error as the second match error reference maximum value.

5. The scene detection method of claim 1, wherein:
obtaining the first numerical value comprises:
along the row direction of the search range, based on the comparison of the relative magnitude of the block match error with the first horizontal threshold and with the second horizontal threshold, determining a number of times the block match error in each row changes periodically; and
summing up the number of times the block match error for each row changes periodically to obtain the first numerical value; and
obtaining the second numerical value comprises:
along the column direction of the search range, based on the comparison of the relative magnitude of the block match error with the first vertical threshold and with the second vertical threshold, determining the a number of times the block match error in each column changes periodically; and
summing up the number of times the block match error for each column changes periodically to obtain the second numerical value.

6. The scene detection method of claim 5, wherein:
determining the number of times the block match error in each row changes periodically comprises:
comparing the relative magnitude of the block match error with the first horizontal threshold in turn along the row to determine whether there is an incremental process of block match errors;
comparing the relative magnitude of the block match error with the second horizontal threshold in turn along the row to determine whether there is a decreasing process of block match errors;
based on the first horizontal threshold and the second horizontal threshold, marking a process of increasing block match error and a process of decreasing block match error as a period; and
obtaining the number of the periods as a number of times the block match error changes periodically for the corresponding block of the current row; and
determining the number of times the block match error in each column changes periodically comprises:
comparing the relative magnitude of the block match error with the first vertical threshold in turn along the column to determine whether there is an increment process of block match errors;
comparing the relative magnitude of the block match error with the second vertical threshold in turn along the column to determine whether there is a decreasing process of block match errors;
based on the first vertical threshold and the second vertical threshold, marking a process of increasing block match error and a process of decreasing block match error as a period; and
obtaining the number of the periods as a number of times the block match error changes periodically for the corresponding block of the current column.

7. The scene detection method of claim 1, wherein determining whether the current central block is located in a periodic scene or not further comprises: after marking the current central block, performing a smoothing process on the marked current central block.

8. The scene detection method of claim 7, wherein the smoothing process comprises:
obtaining the marked current central block and the surrounding blocks within the search range;
in response to the current central block being marked as a non-periodic block, and the number of surrounding blocks which are marked as periodic block being greater than a first reference value, determining that the current central block is located in a periodic scene and re-marking the current central block as a periodic block; and
in response to the current central block being marked as a periodic block, and the number of surrounding blocks which are marked as non-periodic block being less than a second reference value, determining that the current central block is located in a non-periodic scene and re-marking the current central block as a non-periodic block.

9. A non-transitory chip, wherein the non-transitor chip comprises a scene detection module, and the scene detection module comprises:
a block match error calculation unit, used for calculating a block match error between a current central block and a surrounding block within a search range centered on the current central block;
a depth prediction unit, comprising: a horizontal prediction sub-unit, used for obtaining a first match error reference maximum value based on the current central block along a row direction, and outputting the first match error reference maximum value as a horizontal prediction depth; a vertical prediction sub-unit, used for obtaining a second match error reference maximum value based on the current central block along a column direction, and outputting the second match error reference maximum value as a vertical prediction depth;
a search unit, comprising: a setting sub-unit, used for setting a first horizontal threshold and a second horizontal threshold based on the horizontal prediction depth, where the first horizontal threshold is greater than the second horizontal threshold, and setting a first vertical threshold and a second vertical threshold based on the vertical prediction depth, where the first vertical threshold is greater than the second vertical threshold;
a statistical sub-unit, used for determining a first number of periodic changes of the block match error as a first numerical value along the row direction of the search range, based on a comparison of a relative magnitude of the block match error with the first horizontal threshold and with the second horizontal threshold, and determining a second number of periodic changes of the block match error as a second numerical value along the column direction of the search range, based on a relative magnitude of the block match error with the first vertical threshold and with the second vertical threshold;
a judgment unit, used for determining whether the current central block is located in a periodic scene or not based on the first numerical value and the second numerical value, the judgment unit comprising:
- a marker, used for marking the current central block based on the relative magnitudes of the first numerical value and the second numerical value to a preset reference value; the marker is used for marking the current central block as a periodic block in response to at least one of the first and second values being greater than the preset reference value; and the marker is also used for marking the current central block as a non-periodic block in response to both the first and second values being less than the preset reference value.

10. The non-transitory chip of claim 9, wherein:
the horizontal prediction sub-unit comprises:
- a horizontal radius predictor, used for obtaining a first number of blocks with successively increasing block match errors along the row direction, and outputting the first number of blocks as a horizontal prediction radius; and
- a first reference maximum retriever, used for obtaining the block match error corresponding to the horizontal prediction radius at a distance from the central block along the row direction, and outputting the block match error as the first match error reference maximum value; and the vertical prediction sub-unit comprises:
- a vertical radius predictor, for obtaining a second number of blocks with successively increasing block match errors along the column direction, and outputting the second number of blocks as a vertical prediction radius; and
- a second reference maximum retriever, used for obtaining the block match error corresponding to the vertical prediction radius at a distance from the central block along the column direction as the second match error reference maximum value, and outputting the block match error as the second match error reference maximum value.

11. The chip of claim 9, wherein the statistical sub-unit comprises:
- a row counter, used for determining a number of times the block match error in each row changes periodically, based on the relative magnitude of the block match error with the first horizontal threshold and with the second horizontal threshold;
- a row accumulator, used for summing up the number of times the block match error for each row changes periodically to obtain the first numerical value;
- a column counter, used for determining a number of times the block match error in each column changes periodically along the column direction of the search range, based on the relative magnitude of the block match error with the first vertical threshold and with the second vertical threshold;
- a column accumulator, used for summing up the number of times the block match error for each column changes periodically to obtain the second numerical value.

12. The non-transitory chip of claim 11, wherein:
the row counter comprises:
- a row increment judgment block, used for comparing the relative magnitude of the block match error with the first horizontal threshold in turn along the row to determine whether there is an incremental process of block match errors;
- a row decrement judgment block, used for comparing the relative magnitude of the block match error with the second horizontal threshold in turn along the row to determine whether there is a decreasing process of block match errors; and
- a row period acquisition block, used for marking a process of increasing block match errors and a process of decreasing block match errors as a period based on the first horizontal threshold and the second horizontal threshold, and obtaining the number of the periods as a number of times the block match error changes periodically for the corresponding block of the current row; and the column counter comprises:
- a column increment judgment block, used for comparing the relative magnitude of the block match error with the first vertical threshold in turn along the column to determine whether there is an increment process of block match errors;
- a column decrement judgment block, used for comparing the relative magnitude of the block match error with the second vertical threshold in turn along the column to determine whether there is a decreasing process of block match errors;
- a row period acquisition block, used for marking a process of increasing block match errors and a process of decreasing block match errors as a period based on the first vertical threshold and the second vertical threshold, and obtaining the number of the periods as a number of times the block match error changes periodically for the corresponding block of the current column.

13. The non-transitory chip of claim 9, wherein the judgment unit further comprises:
- a smoothing processor, used for performing a smoothing process on the marked current central block output by the marker.

14. The non-transitory chip of claim 13, wherein the smoothing processor comprises:
- an extraction block, used for obtaining the marked current central block and surrounding blocks within the search range;
- an optimization block, used for determining that the current central block is located in a periodic scene and re-marking the current central block as a periodic block in response to the current central block being marked as a non-periodic block, and the number of surrounding blocks which are marked as periodic block being greater than a first reference value; and the optimization block is also used for determining that the current central block is located in a non-periodic scene and re-marking the current central block as a non-periodic block in response to the current central block being marked as a periodic block, and the number of surrounding blocks which are marked as non-periodic block being less than a second reference value.

15. The non-transitory chip of claim 9, wherein the chip further comprises: a motion estimation module, used for performing motion estimation for the blocks located in a periodic scene detected by the scene detection module.

16. An electronic device, wherein the electronic device comprises the non-transitory chip of claim 9.

17. The electronic device of claim 16, wherein the electronic device is a set top box or display device.

* * * * *